US011715825B2

(12) United States Patent
Yushin et al.

(10) Patent No.: US 11,715,825 B2
(45) Date of Patent: Aug. 1, 2023

(54) ELECTRODES, LITHIUM-ION BATTERIES, AND METHODS OF MAKING AND USING SAME

(71) Applicant: Sila Nanotechnologies Inc., Alameda, CA (US)

(72) Inventors: Gleb Yushin, Atlanta, GA (US); Oleksandr Magazynskyy, Atlanta, GA (US); Patrick Dixon, Dunwoody, GA (US); Benjamin Hertzberg, New York, NY (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 0 days.

(21) Appl. No.: 17/667,427

(22) Filed: Feb. 8, 2022

(65) Prior Publication Data

US 2022/0166011 A1    May 26, 2022

Related U.S. Application Data

(63) Continuation of application No. 16/853,301, filed on Apr. 20, 2020, which is a continuation of application
(Continued)

(51) Int. Cl.
*H01M 4/36* (2006.01)
*H01M 4/38* (2006.01)
(Continued)

(52) U.S. Cl.
CPC ........... *H01M 4/366* (2013.01); *H01M 4/133* (2013.01); *H01M 4/137* (2013.01); *H01M 4/38* (2013.01);
(Continued)

(58) Field of Classification Search
CPC ...... H01M 4/366; H01M 4/133; H01M 4/137; H01M 4/38; H01M 4/587; H01M 4/602;
(Continued)

(56) References Cited

U.S. PATENT DOCUMENTS 5,238,760 A    8/1993  Takahashi et al.
8,889,295 B2  11/2014  Yushin et al.
(Continued)

FOREIGN PATENT DOCUMENTS

CN            1891668 A       1/2007
WO         2004022637 A2      3/2004
(Continued)

OTHER PUBLICATIONS

Kim et al., "Effect of Carbon-coated Silicon/Graphite Composite Anode on the Electrochemical Properties," 2008, Bull. Korean Chem. Soc., vol. 29, No. 10, 1965-1968. (Year: 2008).*
(Continued)

*Primary Examiner* — Matthew W Van Oudenaren
(74) *Attorney, Agent, or Firm* — Muncy, Geissler, Olds & Lowe, P.C.; Daniel Podhajny

(57) ABSTRACT

Described herein are improved composite anodes and lithium-ion batteries made therefrom. Further described are methods of making and using the improved anodes and batteries. In general, the anodes include a porous composite having a plurality of agglomerated nanocomposites. At least one of the plurality of agglomerated nanocomposites is formed from a dendritic particle, which is a three-dimensional, randomly-ordered assembly of nanoparticles of an electrically conducting material and a plurality of discrete non-porous nanoparticles of a non-carbon Group 4A element or mixture thereof disposed on a surface of the dendritic particle. At least one nanocomposite of the plurality of agglomerated nanocomposites has at least a portion of its
(Continued)

dendritic particle in electrical communication with at least a portion of a dendritic particle of an adjacent nanocomposite in the plurality of agglomerated nanocomposites.

27 Claims, 6 Drawing Sheets

Related U.S. Application Data

No. 15/612,890, filed on Jun. 2, 2017, now Pat. No. 10,629,898, which is a continuation of application No. 14/513,920, filed on Oct. 14, 2014, now Pat. No. 9,673,448, which is a continuation of application No. 13/431,591, filed on Mar. 27, 2012, now Pat. No. 8,889,295, which is a continuation-in-part of application No. PCT/US2010/050794, filed on Sep. 29, 2010.

(60) Provisional application No. 61/246,741, filed on Sep. 29, 2009.

(51) Int. Cl.
| | | |
|---|---|---|
| H01M 4/587 | (2010.01) | |
| H01M 4/62 | (2006.01) | |
| H01M 4/133 | (2010.01) | |
| H01M 4/137 | (2010.01) | |
| H01M 4/60 | (2006.01) | |
| H01M 4/134 | (2010.01) | |
| H01B 1/18 | (2006.01) | |
| H01B 1/24 | (2006.01) | |
| H01M 4/1395 | (2010.01) | |
| H01M 10/0525 | (2010.01) | |
| B82Y 30/00 | (2011.01) | |
| H01M 4/1393 | (2010.01) | |

(52) U.S. Cl.
CPC ........... *H01M 4/587* (2013.01); *H01M 4/602* (2013.01); *H01M 4/625* (2013.01); *B82Y 30/00* (2013.01); *C01P 2004/64* (2013.01); *H01B 1/18* (2013.01); *H01B 1/24* (2013.01); *H01M 4/134* (2013.01); *H01M 4/1393* (2013.01); *H01M 4/1395* (2013.01); *H01M 4/386* (2013.01); *H01M 4/387* (2013.01); *H01M 10/0525* (2013.01); *Y02E 60/10* (2013.01); *Y02T 10/70* (2013.01); *Y10S 977/773* (2013.01)

(58) Field of Classification Search
CPC .... H01M 4/625; H01M 4/134; H01M 4/1393; H01M 4/1395; H01M 4/386; H01M 4/387; H01M 4/362; H01M 4/364; H01M 4/583; H01M 4/0428; H01M 10/0525; H01B 1/18; H01B 1/24; C01P 2004/64
See application file for complete search history.

(56) References Cited

U.S. PATENT DOCUMENTS

| 8,916,296 | B2 | 12/2014 | Feaver et al. | |
|---|---|---|---|---|
| 9,373,838 | B2 | 6/2016 | Yushin et al. | |
| 9,673,448 | B2 | 6/2017 | Yushin et al. | |
| 10,629,898 | B2 | 4/2020 | Yushin et al. | |
| 2002/0086211 | A1* | 7/2002 | Umeno | H01M 10/0525 |
| | | | | 252/182.1 |
| 2004/0146560 | A1 | 7/2004 | Whiteford et al. | |
| 2004/0247872 | A1* | 12/2004 | Sudo | H01M 4/583 |
| | | | | 428/403 |
| 2005/0063893 | A1 | 3/2005 | Ayala et al. | |
| 2006/0147797 | A1 | 7/2006 | Wu et al. | |
| 2006/0199294 | A1 | 9/2006 | Fujikawa et al. | |
| 2007/0122101 | A1 | 5/2007 | Buretea et al. | |
| 2007/0218362 | A1 | 9/2007 | Nagasaki et al. | |
| 2007/0281216 | A1 | 12/2007 | Petrat et al. | |
| 2008/0038638 | A1* | 2/2008 | Zhang | H01M 4/62 |
| | | | | 429/231.95 |
| 2008/0145761 | A1 | 6/2008 | Petrat et al. | |
| 2008/0261116 | A1* | 10/2008 | Burton | C23C 16/24 |
| | | | | 427/113 |
| 2009/0087731 | A1* | 4/2009 | Fukui | H01M 10/0569 |
| | | | | 429/163 |
| 2009/0239151 | A1* | 9/2009 | Nakanishi | H01M 4/386 |
| | | | | 427/78 |
| 2010/0151324 | A1 | 6/2010 | Green et al. | |
| 2010/0178565 | A1 | 7/2010 | Green | |
| 2010/0255376 | A1 | 10/2010 | Park et al. | |
| 2011/0020701 | A1 | 1/2011 | Park et al. | |
| 2011/0053765 | A1 | 3/2011 | Feaver et al. | |
| 2011/0129729 | A1 | 6/2011 | Kim et al. | |
| 2011/0159375 | A1 | 6/2011 | Feaver et al. | |
| 2011/0177393 | A1 | 7/2011 | Park et al. | |
| 2012/0081838 | A1 | 4/2012 | Constantino et al. | |
| 2012/0100438 | A1 | 4/2012 | Fasching et al. | |
| 2012/0202033 | A1 | 8/2012 | Chang et al. | |
| 2012/0262127 | A1 | 10/2012 | Feaver et al. | |
| 2012/0321959 | A1 | 12/2012 | Yushin et al. | |
| 2012/0328952 | A1 | 12/2012 | Yushin et al. | |
| 2013/0069601 | A1 | 3/2013 | Coowar et al. | |
| 2013/0209348 | A1 | 8/2013 | Ludvik et al. | |
| 2013/0211005 | A1 | 8/2013 | Ludvik et al. | |
| 2013/0252082 | A1 | 9/2013 | Thompkins et al. | |
| 2013/0280601 | A1 | 10/2013 | Geramita et al. | |
| 2014/0166939 | A1 | 6/2014 | Park et al. | |
| 2014/0170498 | A1 | 6/2014 | Park et al. | |
| 2014/0349183 | A1 | 11/2014 | Macklin et al. | |
| 2015/0321920 | A1 | 11/2015 | Geramita et al. | |
| 2020/0014068 | A1 | 1/2020 | Anderson et al. | |
| 2020/0251729 | A1 | 8/2020 | Yushin et al. | |
| 2022/0013767 | A1 | 1/2022 | Yushin et al. | |
| 2022/0166011 | A1 | 5/2022 | Yushin et al. | |

FOREIGN PATENT DOCUMENTS

| WO | 2004027822 | A2 | | 4/2004 |
|---|---|---|---|---|
| WO | 2005096414 | A2 | | 10/2005 |
| WO | WO2006071076 | | * | 7/2006 |
| WO | 2006097380 | A1 | | 9/2006 |
| WO | 2007083155 | A1 | | 7/2007 |
| WO | 2009010758 | A2 | | 1/2009 |
| WO | 2009014399 | A2 | | 1/2009 |
| WO | 2011041468 | A1 | | 4/2011 |
| WO | 2011072256 | A1 | | 6/2011 |
| WO | 2011088472 | A2 | | 7/2011 |
| WO | 2011112992 | A1 | | 9/2011 |
| WO | 2011154692 | A1 | | 12/2011 |
| WO | 2012045002 | A1 | | 4/2012 |
| WO | 2012054766 | A2 | | 4/2012 |
| WO | 2012092210 | A1 | | 7/2012 |
| WO | 2013106782 | A2 | | 7/2013 |
| WO | 2013120009 | A1 | | 8/2013 |
| WO | 2013120011 | A1 | | 8/2013 |
| WO | 2013120028 | A1 | | 8/2013 |
| WO | 2013128201 | A3 | | 9/2013 |

OTHER PUBLICATIONS

Honorato et al.,"Fluidized bed chemical vapor deposition of pyrolytic carbon—I. Effect of deposition conditions on microstructure", Available online Nov. 1, 2008, Carbon, 47, 396-410.

Farrow, R. F. C. "The Kinetics of Silicon Deposition on Silicon by Pyrolysis of Silane: A Mass Spectrometric Investigation by Molecular Beam Sampling." Journal of The Electrochemical Society 121.7 (1974): 899-907.

Vincent, Benjamin, et al. "Low temperature Si homo-epitaxy by reduced pressure chemical vapor deposition using dichlorosilane,

(56) References Cited

OTHER PUBLICATIONS silane and trisilane." Journal of crystal growth 312.19 (2010): 2671-2676.
Hsin, Wei-Chang, Dah-Shyang Tsai, and Y. Shimogaki. "Surface reaction probabilities of silicon hydride radicals in SiH4/H2 thermal chemical vapor deposition." Industrial & engineering chemistry research 41.9 (2002): 2129-2135.

* cited by examiner

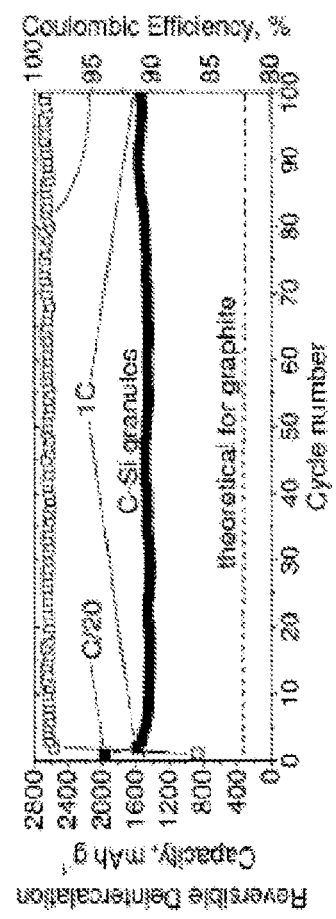
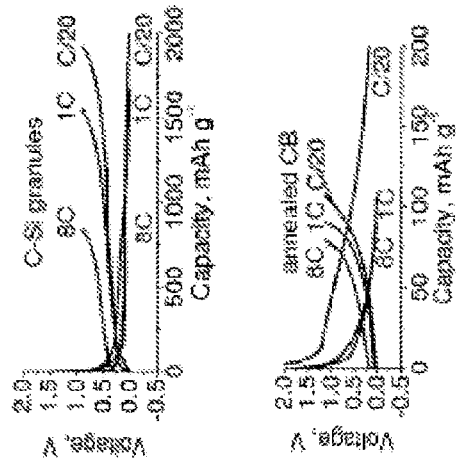
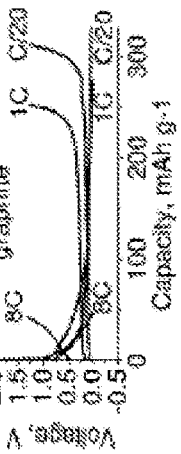
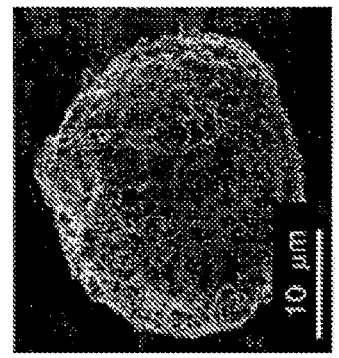
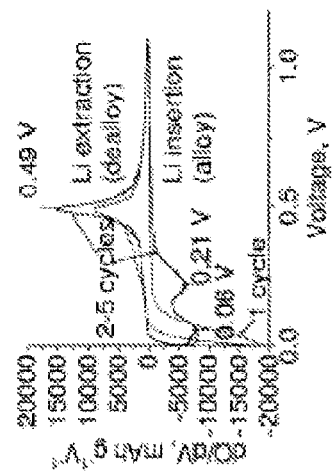
Figure 5(a)
Figure 5(b)
Figure 5(c)
Figure 5(d)

ELECTRODES, LITHIUM-ION BATTERIES, AND METHODS OF MAKING AND USING SAME

PRIORITY CLAIM

The present application is a Continuation of U.S. patent application Ser. No. 16/853,301, filed Apr. 20, 2020, which is a Continuation of U.S. patent application Ser. No. 15/612,890, filed Jun. 2, 2017, which is a Continuation of U.S. patent application Ser. No. 14/513,920, filed Oct. 14, 2014, which is a Continuation of U.S. patent application Ser. No. 13/431,591, filed Mar. 27, 2012, which is a Continuation-in-part of International Application No. PCT/US2010/050794, filed Sep. 29, 2010, which claims the benefit of U.S. Provisional Application No. 61/246,741, filed on Sep. 29, 2009.

STATEMENT REGARDING FEDERALLY SPONSORED RESEARCH OR DEVELOPMENT

This invention was made with United States Government support under SBIR grant number NNX09 CD29P 2008-1 awarded by the National Aeronautics and Space Administration. The United States Government has certain rights in this invention.

BACKGROUND OF THE INVENTION

1. Field of the Invention

The various embodiments of the present invention relate generally to energy storage devices, and more particularly, to lithium-ion batteries, and to methods of making and using such devices.

2. Description of the Relevant Art

Owing in part to their relatively high energy densities, light weight, and potential for long lifetimes, lithium-ion (Li-ion) batteries are used extensively in consumer electronics. In fact, Li-ion batteries have essentially replaced nickel-cadmium and nickel-metal-hydride batteries in many applications. Despite their increasing commercial prevalence, further development of Li-ion batteries is needed, particularly for potential applications in low- or zero-emission hybrid-electrical or fully-electrical vehicles, energy-efficient cargo ships and locomotives, aerospace, and power grids. Such high-power applications will require electrodes with higher specific capacities than those used in currently-existing Li-ion batteries.

Currently, carbon-based materials (e.g., graphite) are employed as the predominant anode material in Li-ion batteries. Carbon (C), in the form of graphite, has a maximum or theoretical specific capacity of about 372 milli-Ampere hours per gram (mAh/g), but suffers from significant capacity losses during cycling.

Silicon-based materials have received great attention as anode candidates because they exhibit specific capacities that are an order of magnitude greater than that of conventional graphite. For example, silicon (Si) has the highest theoretical specific capacity of all the metals, topping out at about 4200 mAh/g. Unfortunately, silicon suffers from its own significant setbacks.

The primary shortcoming of Si-based anode materials is the volume expansion and contraction that occurs as a result of lithium ion intercalation and deintercalation, respectively, during charge cycling of the battery. In some cases, a silicon-based anode can exhibit an increase, and subsequent decrease, in volume of up to about 400%. These high levels of strain experienced by the anode material can cause irreversible mechanical damage to the anode. Ultimately, this can lead to a loss of contact between the anode and an underlying current collector. Another shortcoming associated with Si-based anode materials is their low electrical conductivity relative to carbon-based anode materials.

The use of silicon-carbon composites to circumvent the limitations of pure Si-based materials has been investigated. Such composites, which have been prepared by pyrolysis, mechanical mixing and milling, or some combination thereof, generally include Si particles embedded in or on a dense carbon matrix. The large volume changes in the Si particles upon lithium intercalation, however, can be accommodated by carbon only to a limited degree, thus offering only limited stability and capacity enhancements relative to pure Si-based anodes.

Thus, despite the advancements made in anode materials, Li-ion batteries remain somewhat limited in their applications. Accordingly, there remains a need for improved anodes for use in Li-ion batteries. These improved anodes, and, ultimately, the improved Li-ion batteries, could open up new applications, such as the so-called high-power applications contemplated above. It is to the provision of such devices that the various embodiments of the present inventions are directed.

SUMMARY OF THE INVENTION

The various embodiments of the present invention provide improved Li-ion battery components, improved Li-ion batteries made therefrom, and methods of making and using such components and devices.

According to some embodiments of the present invention, an anode includes a porous composite comprising a plurality of agglomerated nanocomposites. At least one, and as many as all, of the plurality of nanocomposites includes a dendritic particle formed from a three-dimensional, randomly-ordered assembly of nanoparticles of an electrically conducting material (e.g., carbon, silicon, lithium-silicon alloys) and a plurality of discrete non-porous nanoparticles of a non-carbon Group 4A element or mixture thereof (i.e., silicon, germanium, tin, lead, and an alloy (e.g., lithium-silicon alloys) or solid solution thereof) disposed on a surface of the dendritic particle. At least one nanocomposite of the plurality of agglomerated nanocomposites has at least a portion of its dendritic particle in electrical communication with at least a portion of a dendritic particle of an adjacent nanocomposite in the plurality of agglomerated nanocomposites.

In some cases, the electrically conducting material of the dendritic particle can be amorphous or graphitic carbon. For example, the amorphous carbon can be carbon black. The non-carbon Group 4A element or mixture thereof is silicon.

In certain situations, the porous composite also includes an electrically conducting coating disposed on at least a portion of a surface of a dendritic particle of at least one of the plurality of agglomerated nanocomposites. The electrically conducting coating can be formed from carbon, too.

It is possible for the plurality of agglomerated nanocomposites to be agglomerated together using an electrically conducting additive. Similarly, the electrically conducting additive can be carbon.

It is possible, in some embodiments, for at least a portion of the discrete non-porous nanoparticles on the surface of the dendritic particle to contact each other.

In certain embodiments, the plurality of discrete non-porous nanoparticles have an average longest dimension of about 5 nanometers to about 500 nanometers.

The plurality of discrete non-porous nanoparticles can comprise about 15 weight percent to about 90 weight percent of each nanocomposite.

The porous composite can be a spherical or substantially-spherical granule as desired.

A total pore volume within the porous composite can be at least about 1.5 times a volume occupied by all of the nanoparticles in the porous composite. At the other end, the total pore volume within the porous composite can be less than about 20 times the volume occupied by all of the nanoparticles in the porous composite.

According to other embodiments of the present invention, an anode can include a matrix of a plurality of spherical or substantially-spherical porous composite granules. At least one granule, and as many as all of the granules, in the plurality of granules comprises a plurality of agglomerated nanocomposites. At least one nanocomposite of the plurality of agglomerated nanocomposites includes a dendritic particle formed from a three-dimensional, randomly-ordered assembly of annealed carbon black nanoparticles and a plurality of discrete non-porous silicon nanoparticles disposed on a surface of the dendritic particle. At least one nanocomposite, and as many as all of the nanocomposites, has at least a portion of its dendritic particle in electrical communication with at least a portion of a dendritic particle of an adjacent nanocomposite in the plurality of agglomerated nanocomposites.

A lithium ion battery can include any of the anodes described herein.

According to some embodiments of the present invention, a method of making an anode can include forming a three-dimensional, randomly-ordered dendritic particle from a plurality of discrete nanoparticles of an electrically conducting material. The method can also include disposing a plurality of discrete non-porous nanoparticles of a non-carbon Group 4A element or mixture thereof on a surface of the dendritic particle to form a nanocomposite particle. The method can further include assembling a plurality of nanocomposite particles to form a bulk unitary body or a spherical or substantially-spherical granule. Each nanocomposite particle of the plurality of nanocomposite particles can have at least a portion of the dendritic particle in electrical communication with at least a portion of a dendritic particle of an adjacent nanocomposite particle in the plurality of agglomerated nanocomposite particles.

In some cases, the method further includes assembling a plurality of granules to form an anode matrix, wherein at least a portion of at least one nanocomposite particle of each granule has a dendritic particle in electrical communication with a dendritic particle of at least a portion of at least one nanocomposite particle of an adjacent granule.

When the non-carbon Group 4A element or mixture thereof is silicon, disposing the plurality of discrete non-porous silicon nanoparticles can involve chemical vapor deposition of a decomposition product of a silane or chlorosilane.

Assembling the plurality of nanocomposite particles to form the bulk unitary body or the spherical or substantially-spherical granule can involve granulation of the plurality of nanocomposite particles. The granulation step can include wet granulation using a polymeric binder that is ultimately converted into carbon.

In some cases, the method further includes applying an electrically conducting coating to at least a portion of the assembled plurality of nanocomposite particles.

In some cases, the method also includes adding an electrically conducting additive to enhance the electrical communication.

BRIEF DESCRIPTION OF THE DRAWINGS

Advantages of the present invention will become apparent to those skilled in the art with the benefit of the following detailed description of embodiments and upon reference to the accompanying drawings in which:

FIG. 5(a) provides information regarding the electrochemical performance of the Si—C granules as anodes in coin cell batteries taken at room temperature in two-electrode 2016 coin-type half-cells;

FIG. 5(b) illustrates the galvanostatic charge-discharge profiles of the granule electrodes at rates of about C/20, 1 C and 8 C in comparison to that of annealed carbon black- and commercial graphite-based electrodes between 0 and 1.1 V;

FIG. 5(c) illustrates differential capacity curves of the granule electrodes in the potential window of 0 to 1.1 V collected at the rate of 0.025 mV/s;

FIG. 5(d) provides a SEM image of a granule after electrochemical cycling;

Figure 1A:
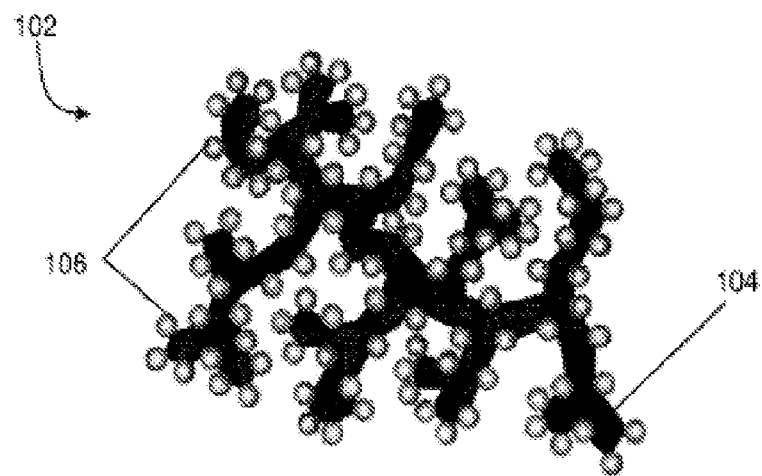
FIG. 1(a) is a schematic illustration of an exemplary nanocomposite building block for making an anode in accordance with some embodiments.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

As stated above, the various embodiments of the present invention are directed to improved anodes for use in Li-ion batteries, and Li-ion batteries made therefrom. Methods of making and using the improved anodes and batteries are also disclosed herein.

The improved anodes generally include composites of a non-carbon Group 4A element or mixture thereof (e.g., silicon or lithium-silicon alloys) and an electrically conducting material (e.g., carbon). In contrast to the prior art, however, the improved composite anodes described herein are highly porous and can accommodate the significant volume changes typically caused by lithium alloying into the non-carbon Group 4A element or mixture thereof. As will be described in more detail below, pre-existing pores in the composite anodes provide sufficient volume for expansion and allow for fast transport of lithium ions, while the presence of an electrically conducting material allows for an improved solid/electrolyte interface formation, structural integrity, and high electrical conductivity. As a result, the porous composite anodes can conserve their size and shape upon cycling, which is important for industrial applications because commercial battery cells provide very little, if any, volume for anode expansion.

Structurally, the so-called "building blocks" of the anodes described herein are individual nanocomposites, such as the one shown in FIG. 1(a), which are formed from electrically conducting dendritic particles that have a plurality of discrete, non-porous nanoparticles of a non-carbon Group 4A element or mixture thereof disposed thereon.

As seen in FIG. 1(a), the nanocomposite 102 comprises a dendritic particle 104, which itself is a three-dimensional, randomly-ordered assembly or agglomerate of nanoparticles (not individually shown) of an electrically conducting material. The individual nanoparticles that form the dendritic particle 104 generally have an average longest dimension of about 5 nm to about 250 nm. As a result, the dendritic particle 104 generally has a longest dimension of about 100 nanometers (nm) to about 5 micrometers (μm).

In exemplary embodiments, the electrically conducting material used to form the dendritic particle 104 is elemental carbon in one of its amorphous (e.g., coal, soot, carbon black, or the like) or graphitic allotropes. In addition to elemental carbon, other electrically conducting materials that are stable under the conditions to which they will be exposed (i.e., they do not react with or substantially solubilize silicon during fabrication or use of the anode) can be implemented. Such materials will be readily apparent to those skilled in the art to which this disclosure pertains. By way of illustration, nickel is one such material.

Returning to the nanocomposites 102 in FIG. 1(a), disposed on the dendritic particle 104 is a plurality of discrete and non-porous nanoparticles 106 of silicon, tin (Sn), germanium (Ge), lead (Pb), or an alloy or solid solution of Si, Sn, Ge, and/or Pb. Reference will now be made to embodiments involving silicon as the non-carbon Group 4A element for illustrative convenience only.

Generally, the plurality of the discrete, non-porous silicon nanoparticles 106 can have an average longest dimension of about 5 nm to about 200 nm. Since the native oxide that forms on the surface of silicon nanoparticles is about 0.5 nm to about 1 nm thick, particles with an average longest dimension of about 1 nm to about 3 nm are too small to be used in the anodes of the present invention.

The plurality of silicon nanoparticles 106 can comprise about 15 weight percent (wt. %) to about 90 wt. % of the nanocomposite 102, based on the total weight of the nanocomposite 102. In general, a lower silicon content results in better long-term stability of the anode, particularly when carbon is used as the electrically conducting material of the dendritic particle 104, because carbon can undergo a large number of charge/discharge cycles without failing. In contrast, when the silicon content is higher, the resulting anode will exhibit better gravimetric capacity. Thus, in applications where long-term stability of the Li-ion battery is more desired than a higher gravimetric capacity, those skilled in the art to which this disclosure pertains would appreciate that lower silicon contents will be used. Similarly, in applications where the capacity of the Li-ion battery is more important than the long-term stability, higher silicon contents will be used to form the nanocomposite 102.

The anodes generally include a plurality of the nanocomposite building blocks 102 agglomerated or assembled together. As shown at the end of the process flow diagram in FIG. 2, these agglomerates or assemblies can be in the form of a bulk unitary body 100 that adopts the ultimate shape of the anode. Alternatively, these agglomerates can be in the form of a particle or granule (e.g., the substantially spherical granule shown in FIG. 1(b) and designated by reference numeral 100), which can then be packed together in close proximity with other such particles or granules to form a matrix.

Each individual nanocomposite 102 within the agglomerate 100 is assembled in such a manner as to be in electrical communication with at least one other nanocomposite building block 102. This is generally accomplished by having at least a portion of a surface of the dendritic particle 104 of one nanocomposite 102 in contact with at least a portion of a surface of a dendritic particle 104 of another nanocomposite 102. In this manner, the conductivity of the anode is not unnecessarily decreased by the surface resistance at nanocomposite-nanocomposite boundaries. Similarly, when the anode comprises a plurality of agglomerated particles or granules 100, as shown in FIG. 1(b), the particles or granules 100 are packed or arranged into a matrix in such a manner as to have each particle 100 be in electrical communication with at least one other particle 100.

It should be noted that, in embodiments where the silicon content of the nanocomposites 102 is high, it may be more difficult to ensure that dendritic particles 100 of different nanocomposites 102 are in sufficiently-high contact with one another. In such cases, the electrical communication between individual nanocomposites 102 can be improved by implementing an optional layer or coating of an electrically conducting material (not shown) on at least a portion of the nanocomposites 102. This optional coating can be disposed directly on the nanocomposites 102 before, during, or after the individual nanocomposites 102 are brought into sufficient proximity to one another to form the assembly or agglomerate 100. The electrically conducting material of the optional coating can be the same or a different material as the electrically conducting material of the dendritic particle 104. This optional coating can even be disposed directly on the silicon nanoparticles, but must be formed of a material, and have a thickness, that will enable lithium ions to diffuse therethrough. The optional electrically conducting coating can also serve to impede the decomposition of the electrolyte, which results in the formation of the solid-electrolyte interface (SET) layer.

Alternatively, instead of an electrically conducting coating or layer, an electrically conducting additive can be used to ensure that dendritic particles 100 of different nanocomposites 102 are in sufficiently-high contact with one another. One example of such an additive is an organic binder that converts primarily to carbon during fabrication and prior to implementation of the anode. Exemplary binders include polymeric materials having at least about 20 atomic percent carbon in the monomeric unit used to form the polymer. Suitable polymers include polyethers, polyesters, carbon homochain polymers, i.e., polyacrylates, polymethacrylates, polymers based on acrylonitrile, polymers based on vinylidene fluoride, and the like. Other additives for such purposes are known to those skilled in the art to which this disclosure pertains.

Figure 1B:
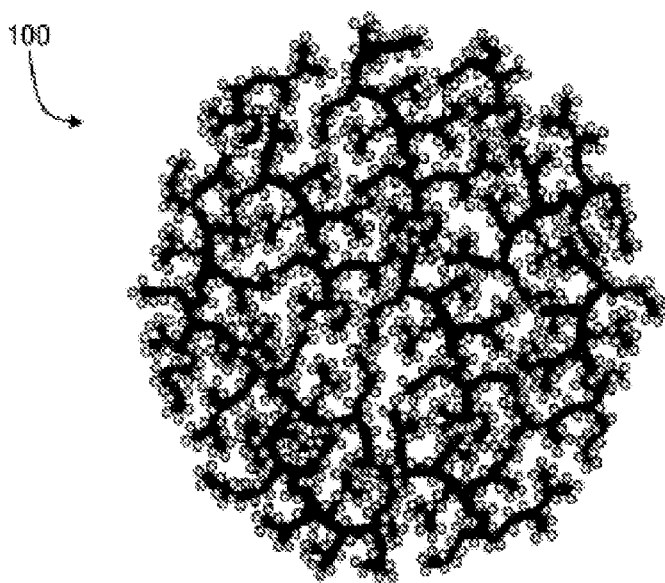
FIG. 1(b) is a schematic illustration of an exemplary granule for making an anode in accordance with some embodiments.
Figure 2:
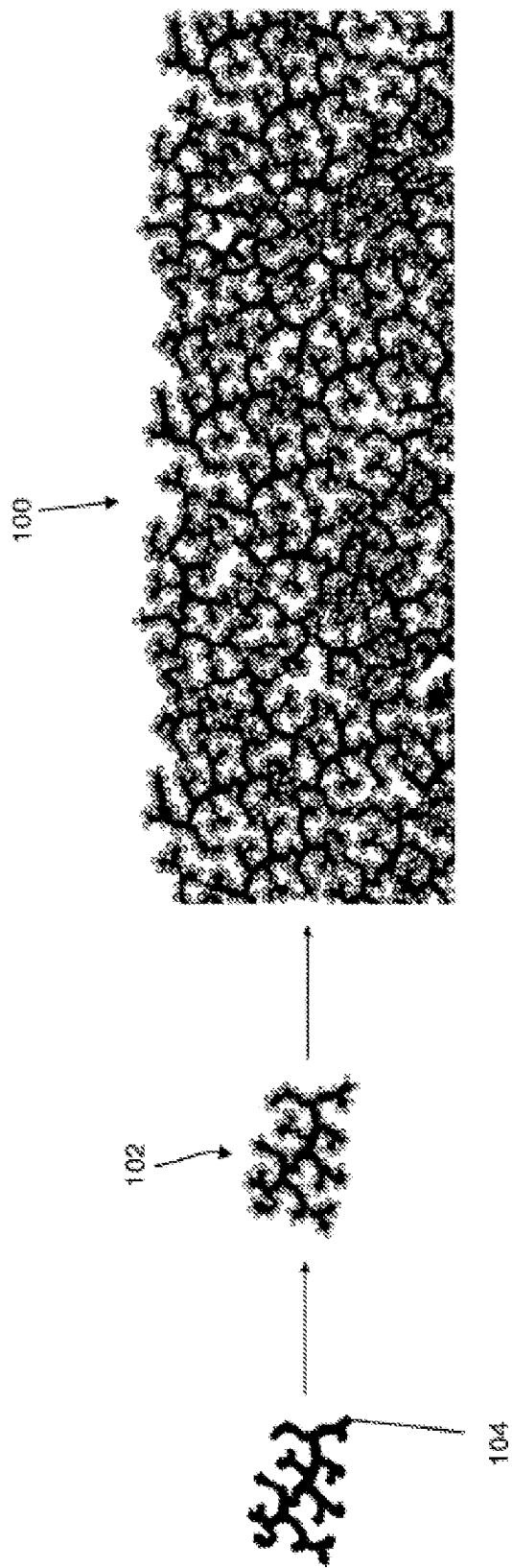
FIG. 2 is a schematic illustration of an exemplary process for making an anode in accordance with some embodiments.

As can be seen from the agglomerated nanocomposites 100 in FIGS. 1(b) and 2, regardless of how the nanocomposites 102 are assembled, the anode will have a high level of porosity. The exact porosity of the anode, however, will depend on the silicon content of the individual nanocomposites 102. Generally, the available pore volume for silicon expansion and contraction during charge cycling will be at least about three times the volume of the silicon nanoparticles. This threshold pore space will minimize or completely prevent the anode from experiencing any strain as a result of the silicon expansion. In order to minimize any adverse effects on the volumetric performance of the anode, the pore volume should be limited to less than or equal to about 20 times the overall volume of the silicon nanoparticles. That is, when the pore volume is greater than about 20 times the volume of the silicon nanoparticles, the volumetric capacitance of the anode begins to suffer.

The anodes described above can be made using a variety of techniques. FIG. 2 provides a representative illustration of the general processes for making an anode. As seen in the first step of the process flow diagram of FIG. 2, these processes include forming a three-dimensional, randomly-ordered dendritic particle 104 from a plurality of discrete nanoparticles of an electrically conducting material. Next, a plurality of discrete non-porous silicon nanoparticles 106 are disposed on the dendritic particle to form a nanocomposite particle 102. Finally, a plurality of nanocomposite particles 102 are assembled together to form a bulk material 100 or a granule (shown in FIG. 1(b)) 100. In the latter case, a plurality of the granules 100 can then be consolidated into a matrix that will serve as the anode.

The plurality of discrete nanoparticles of the electrically conducting material can be assembled into the dendritic particle 104 in a number of ways. These include using a purely thermal treatment (e.g., sintering or annealing the particles together), sonication, chemically reacting the nanoparticles with one another, spontaneously (e.g., via a reduction in the surface energy of adjacent nanoparticles), and/or the like. In one embodiment, a carbon dendritic particle may be formed by annealing carbon black particles at elevated temperatures (e.g., above 1800 C) which causes a portion of the particles to be fused/sintered together. In another embodiment, a dendritic particle may be formed by carbonizing a gaseous carbon precursor (e.g., a hydrocarbon gas) under conditions that promote the formation of dendritic carbon particles. Typically pyrolysis of a hydrocarbon gas at 1 atm pressure and temperatures of 700 C to 1400 C will promote dendritic particle formation. In a similar manner, carbon dendritic particles may be formed by pyrolysis of polymeric particles.

Once the dendritic particle 104 is formed, the silicon nanoparticles 106 can be disposed thereon. In some embodiments, the silicon nanoparticles 106 can be grown directly on the surface of the dendritic particle 104. Many deposition techniques can be used to do this, including, without limitation, physical vapor deposition and all of the variants thereof, chemical vapor deposition and all of the variants thereof, sputtering and all of the variants thereof, ablation deposition and all of the variants thereof, molecular beam epitaxy and all of the variants thereof, electrospray ionization and all of the variants thereof, and the like. In other embodiments, the silicon nanoparticles 106 can be prepared independently, and then coupled to the surface of the dendritic particle 104 using physical or chemical means.

In some embodiments the silicon nanoparticles 106 are discrete particles so as to not form a continuous or substantially-continuous film on the surface of the dendritic particle 104. By remaining as discrete particles, silicon can expand and contract during charge cycling with minimal or no strain to the anode. In contrast, if the silicon were disposed on the dendritic particle 104 as a continuous film or layer, there would be less pore space in the overall anode. This could result in slower or less lithium ion movement into and out from the anode during charge cycling. It can also result in greater strain on the anode because significantly more of the anode could undergo expansion and contraction during charge cycling.

In some embodiments, the silicon nanoparticles 106 are fully dense (i.e., less than or equal to about 5 percent of the surface of the nanoparticle comprises pore walls, based on the total surface area of the nanoparticle), rather than porous. Porosity in the silicon itself can result in lithium ions being trapped within the pore walls, thereby causing capacity losses for the anode.

Once the silicon nanoparticles 106 are disposed on the dendritic particles 104 to form the nanocomposite building blocks 102, the overall anode structure can be formed. That is, a plurality of the nanocomposite building blocks 102 can be assembled together to form the anode. In some cases, the nanocomposite building blocks 102 can be assembled to form a larger particle or granule 100. Next, a plurality of granules can be consolidated into a matrix, which will serve as the anode. Alternatively, the nanocomposite building blocks 102 can be assembled to form a bulk structure 100, which will serve as the anode.

The nanocomposite building blocks 102 can be aggregated using a variety of techniques. These include the use of self assembly chemistry, pressure, heat, granulation, a binder, combinations thereof, or the like.

If the optional electrically conducting coating is used, it can be implemented after the nanocomposite building blocks 102 are produced, either before or during the step where the nanocomposite building blocks 102 are aggregated. Alternatively, after the nanocomposite building blocks 102 are aggregated, the optional electrically conducting coating can be applied to the aggregated nanocomposite building blocks 102. This coating can be applied to the nanocomposite building blocks 102 using any of the techniques described above for growing the silicon nanoparticles 106.

If, however, the optional electrically conducting additive is used, it can be incorporated during or after the step where the nanocomposite building blocks 102 are aggregated.

If the nanocomposite building blocks 102 are aggregated into granules or particles 100, a plurality of granules or particles 100 can be placed in close contact with one another to form a matrix, which can serve as the anode.

Once the anode is formed, it can be implemented in the fabrication of a Li-ion battery. Such a battery would include an anode as described herein, a cathode, and an electrolyte separator, which is interposed between the anode and the cathode. Any type of Li-ion battery can be formed using the anodes described herein, as would be understood by those skilled in the art to which this disclosure pertains.

During operation of the Li-ion battery, the battery cell can be charged and discharged as would be understood by those skilled in the art to which this disclosure pertains. By way of illustration, when the battery is in use (i.e., discharging), lithium ions deintercalate from the silicon nanoparticles 106 of the anode (causing the silicon nanoparticles 106 to contract), migrate through the ion-conducting electrolyte, and intercalate into the cathode. The motion of each lithium ion in the internal circuit of the Li-ion battery is compensated for by the motion of an electron in the external circuit, thus generating an electric current. The energy density by weight released by these reactions is both proportional to the potential difference between the two electrodes and to the amount of lithium that will be intercalated into the cathode.

In contrast, when the battery is being charged or recharged, the opposite process occurs. That is, when an electron moves in the opposite direction in the external circuit (from the power source charging the battery) lithium ions deintercalate from the cathode, migrate through the ion-conducting electrolyte, and intercalate into the silicon nanoparticles 106 of the anode, causing the silicon nanoparticles 106 to swell or expand.

Again, owing to the structure of the anodes described herein, it is possible for the charge-cycling process to be repeated numerous times with minimal or no strain on the anode.

An exemplary anode structure and process for making the anode structure will now be described. In this particular embodiment, the dendritic particle 104 is formed from carbon black nanoparticles that have been joined together. Alternatively, commercially available dendritic C particles may be used. Annealing the carbon black nanoparticles serves to increase the purity of the carbon, which in turn serves to increase the cycle life of the anode. Carbon black nanoparticles are used in this embodiment owing to their relatively low cost and level of initial purity relative to other allotropes of carbon.

Once the dendritic particle 104 including the annealed carbon black nanoparticles has been formed, silicon nanoparticles 106 are grown on the surface using chemical vapor deposition (CVD). Specifically, a silane or a chlorosilane precursor composition is decomposed so as to deposit silicon on the surface of the carbon black dendritic particle 104. Any defects on the surface of the carbon black dendritic particle 104 serve as nucleation sites for the silicon nanoparticle growth. Care must be taken to minimize the presence of oxygen during growth so as to avoid the formation of large amounts of native oxide on the surface of the silicon nanoparticles 106. Once the silicon nanoparticle CVD step is complete, the Si—C nanocomposite building block 102 is formed. In an alternate embodiment, nanoparticles of a lithium-silicon alloy are formed on the surface of the dendritic particle.

Next, a plurality of the Si—C nanocomposites 102 can be compacted together to form a porous composite 100. The shape of the porous composite 100 can be maintained by exposing the plurality of compacted Si—C nanocomposites 102 to a carbon CVD step where a layer of carbon is grown on at least a portion of the various surfaces of the nanocomposites by decomposition of a hydrocarbon precursor. The layer of carbon joins the plurality of Si—C nanocomposites together to form a porous composite.

In some cases, the shape of the porous composite 100 can be maintained by mixing the plurality of compacted Si—C nanocomposites 102 with a sacrificial binder. The porous composite 100 can be exposed to a heat treatment in an oxygen-free environment to transform the sacrificial binder into carbon.

In some embodiments, the surface of porous composite 100 can be coated with a Li-ion permeable material, including but not limited to Li-ion permeable metal oxides, Li-ion permeable metal fluorides, Li-ion permeable carbon and Li-ion permeable polymers.

In some embodiments, a Li-ion permeable metal oxide layer may be formed on the surface of porous composite 100. The thickness of such a layer may in the range of 1 to 20 nm. In some embodiments, an aluminum oxide layer, may be formed on the surface of porous composite 100. In some cases, oxides of other metals that naturally form protective oxide layers on their surfaces could be used instead of aluminum oxide. These include, but are not limited to titanium (Ti) oxide, chromium (Cr) oxide, tantalum (Ta) oxide, niobium (Nb) oxide, and others. Deposition of such oxide coatings can be performed using a variety of oxide coating deposition techniques, including physical vapor deposition, chemical vapor deposition, magnetron sputtering, atomic layer deposition, microwave-assisted deposition, wet chemistry, and others.

For example, metal oxide precursors in the form of a water-soluble salt may be added to the suspension (in water) of the porous composite 100 to be coated. The addition of a base (e.g., sodium hydroxide or amine) causes formation of a metal (M) hydroxide. Porous composite particles suspended in the mixture may then act as nucleation sites for M-hydroxide precipitation. Once particles are coated with a shell of M-hydroxide, they can be annealed in order to convert the hydroxide shell into a corresponding oxide layer that is then well-adhered to the porous composite.

In some embodiments, a Li-ion permeable metal fluoride or metal oxyfluoride layer may be formed on the surface of porous composite 100. Examples of such metal fluoride materials include, but are not limited to: vanadium fluoride, vanadium oxyfluoride, iron fluoride, iron oxyfluoride, aluminum fluoride, aluminum oxyfluoride, titanium fluoride, titanium oxyfluoride, aluminum fluoride, aluminum oxyfluoride, zinc fluoride, zinc oxyfluoride, niobium fluoride, niobium oxyfluoride, tantalum fluoride, tantalum oxyfluoride, nickel fluoride, nickel oxyfluoride, magnesium fluoride, magnesium oxyfluoride, copper fluoride, copper oxyfluoride, manganese fluoride, and manganese oxyfluoride. The thickness of such a layer may be in the range of about 1 nm to about 20 nm.

In some embodiments, a Li-ion permeable carbon layer may be formed on the surface of porous composite 100. The thickness of such a layer may in the range of about 1 nm to about 20 nm.

In some embodiments, a Li-ion permeable polymer layer may be formed on the surface of porous composite 100. The thickness of such a layer may in the range of 1 to 20 nm. In some embodiments such a polymer layer is electrically conductive. In other embodiments such a polymer layer is electrically insulative. Examples of Li-ion permeable polymers include but are not limited to sulfonated polystyrene grafted fluorinated ethylene propylene, sulfonated inorganic-organic hybrid polymers, partially fluorinated polystyrenes, organically modified layered phosphonates, polyphenylene, sulfide, poly(ether ketone), polysaccharides, and poly(ethylene glycol), poly(ethylene oxide).

In some embodiments, the surface of porous composite 100 can be coated with several (2 or more) different layers of Li-ion permeable materials, including but not limited to Li-ion permeable metal oxides, Li-ion permeable metal fluorides, Li-ion permeable carbon and Li-ion permeable polymers.

In some embodiments, the interface between a surface of porous composite 100 and the coating layers may contain additional pores. These pores will provide some volume for Si expansion. In some embodiment, such pores can be produced using a sacrificial material. For example, a surface of porous composite 100 may be coated first with a polymer, which decomposes upon heating, and then with a metal oxide or a metal oxide precursor. After annealing the sacrificial polymer interlayer may decompose forming a void between a surface of porous composite 100 and a metal oxide layer.

In another example, a surface of porous composite 100 may be coated first with a polymer, which decomposes upon heating, and then with a polymer which carbonizes (transforms into carbon) upon heating. After annealing the sacrificial polymer interlayer may decompose forming a void between a surface of porous composite 100 and a carbon layer.

In yet another example, a surface of porous composite 100 may be coated first with a sacrificial oxide, which can be dissolved in certain etching chemicals (acids or bases), and then further coated with a layer of carbon. Upon the treatment of the coated composite in the etching chemicals the oxide layer may dissolve forming voids between the surface of the porous composite and a carbon coating layer. In one embodiment silicon oxide or aluminum oxide can act as such sacrificial oxide layer.

The resulting coated dendritic C—Si particles may be combined to form a porous composite that can be used to form an anode of a battery.

A plurality of porous composites 100 can be assembled together to form a matrix having the desired shape of the anode. The shape of the matrix can be maintained using any of the techniques described for forming the porous composite 100 from the plurality of the Si—C nanocomposites 102.

In other situations, instead of a porous composite 100, the plurality of the dendritic C—Si particles 102 can be compacted together into the final desired shape of the anode. Again, the shape of such a bulk compacted anode body can be maintained using any of the techniques described for forming the porous composite 100 from the plurality of dendritic C—Si particles.

In another embodiment, Si may be used as the material used to form the dendritic particles. In this embodiment, dendritic particles of Si may be formed by pyrolysis (decomposition) of silane ($SiH_4$) or chlorosilane gases. Silane compounds decompose into silicon particles, which fuse/sinter together to form dendritic particles that are a three-dimensional, randomly-ordered assembly or agglomerate of the Si nanoparticles. The Si dendritic particles can be formed into a porous composite. The porous composite may be formed by exposing a plurality of dendritic Si particles to a carbon CVD step where a layer of carbon is grown on at least a portion of the various surfaces of the dendritic Si particles by decomposition of a hydrocarbon gas precursor. In an alternate embodiment, a lithium-silicon alloy may be used to form dendritic particles.

In some embodiments the deposited carbon on the surface of the Si dendritic particles binds the dendritic particles together as a dendritic Si—C porous composite that may be used to form an electrode (e.g., an anode) of a battery.

In another embodiment, a porous Si—C composite may be formed using a sacrificial binder. In an embodiment, dendritic particles of Si may be formed from silane ($SiH_4$) or chlorosilane gases. Alternatively, commercially available dendritic Si particles may be used. The dendritic Si particles may be coated with a sacrificial polymer binder, which transforms into a conductive carbon layer during thermal annealing in an inert environment. This carbon binds particles together forming a dendritic Si—C porous composite.

In some embodiments, the surface of a dendritic Si—C porous composite can be coated with a Li-ion permeable material, including but not limited to Li-ion permeable metal oxides, Li-ion permeable metal fluorides, Li-ion permeable carbon and Li-ion permeable polymers.

In some embodiments, a Li-ion permeable metal oxide layer may be formed on the surface of the dendritic Si—C porous composite. The thickness of such a layer may be in the range of about 1 nm to 20 nm. In some embodiments, an aluminum oxide layer, may be formed on the surface of the dendritic Si—C porous composite. In some cases, oxides of other metals that naturally form protective oxide layers on their surfaces could be used instead of aluminum oxide. These include, but are not limited to titanium (Ti) oxide, chromium (Cr) oxide, tantalum (Ta) oxide, niobium (Nb) oxide, and others. Deposition of such oxide coatings can be performed using a variety of oxide coating deposition techniques, including physical vapor deposition, chemical vapor deposition, magnetron sputtering, atomic layer deposition, microwave-assisted deposition, wet chemistry, and others.

For example, metal oxide precursors in the form of a water-soluble salt may be added to the suspension (in water) of the dendritic Si—C porous composite to be coated. The addition of the base (e.g., sodium hydroxide or amine) causes formation of a metal (M) hydroxide. Dendritic Si—C porous composite particles suspended in the mixture may then act as nucleation sites for M-hydroxide precipitation. Once dendritic Si—C porous composites are coated with a shell of M-hydroxide, they can be annealed in order to convert the hydroxide shell into a corresponding oxide layer that is then well-adhered to the composite surface.

In some embodiments, a Li-ion permeable metal fluoride or metal oxyfluoride layer may be formed on the surface of a dendritic Si—C porous composite. Examples of such metal fluoride materials include, but are not limited to: vanadium fluoride, vanadium oxyfluoride, iron fluoride, iron oxyfluoride, aluminum fluoride, aluminum oxyfluoride, titanium fluoride, titanium oxyfluoride, aluminum fluoride, aluminum oxyfluoride, zinc fluoride, zinc oxyfluoride, niobium fluoride, niobium oxyfluoride, tantalum fluoride, tantalum oxyfluoride, nickel fluoride, nickel oxyfluoride, magnesium fluoride, magnesium oxyfluoride, copper fluoride, copper oxyfluoride, manganese fluoride, and manganese oxyfluoride. The thickness of such a layer may be in the range of about 1 nm to about 20 nm.

In some embodiments, a Li-ion permeable polymer layer may be formed on the surface of a dendritic Si—C porous composite. The thickness of such a layer may be in the range of about 1 nm to about 20 nm. In some embodiments such a polymer layer is electrically conductive. In other embodiments such a polymer layer is electrically insulative. Examples of Li-ion permeable polymers include but are not limited to sulfonated polystyrene grafted fluorinated ethylene propylene, sulfonated inorganic-organic hybrid polymers, partially fluorinated polystyrenes, organically modified layered phosphonates, polyphenylene sulfide, poly (ether ketone), polysaccharides, poly(ethylene glycol); and poly(ethylene oxide).

In some embodiments, the surface of a dendritic Si—C porous composite can be coated with several (2 or more) different layers of Li-ion permeable materials, including but not limited to Li-ion permeable metal oxides, Li-ion permeable metal fluorides, Li-ion permeable carbon and Li-ion permeable polymers.

In some embodiments, the interface between a surface of a dendritic Si—C porous composite and the coating layers may contain additional pores. These pores will provide some volume for Si expansion. In some embodiment, such pores can be produced using a sacrificial material. For example, a surface of a dendritic Si—C porous composite may be coated first with a polymer, which decomposes upon heating, and then with a metal oxide or a metal oxide precursor. After annealing the sacrificial polymer interlayer may decompose forming a void between a surface of the dendritic Si—C porous composite and a metal oxide layer. In another example, a surface of the dendritic Si—C porous composite may be coated first with a polymer, which decomposes upon heating, and then with a polymer which carbonizes (transforms into carbon) upon heating. After annealing the sacrificial polymer interlayer may decompose forming a void (or voids) between a surface of the dendritic Si—C porous composite and a carbon layer. This void will provide space for Si expansion, while the surface C layer will inhibit access of the electrolyte solvent to the Si surface.

In yet another example, a surface of a dendritic Si—C porous composite may be coated first with a sacrificial oxide, which can be dissolved in certain etching chemicals (acids or bases), and then further coated with a layer of carbon. Upon the treatment of the coated composite in the etching chemicals the oxide layer may dissolve forming voids between the surface of a composite and a carbon coating layer. In one embodiment silicon oxide or aluminum oxide can act as such sacrificial oxide layer.

The coated or uncoated dendritic Si—C porous composite may be used to form an anode as previously described.

In some embodiments, a Li-ion permeable material, including but not limited to Li-ion permeable metal oxides, Li-ion permeable metal fluorides, Li-ion permeable carbon, Li-ion permeable polymers or any combination thereof, may be formed on the surface of the dendritic Si particles before forming a dendritic Si—C composite.

In some embodiments, a Li-ion permeable metal oxide layer may be formed on the surface of dendritic Si particles. The thickness of such a layer may be in the range of about 1 nm to 20 nm. In some embodiments, an aluminum oxide layer, may be formed on the surface of the dendritic Si particles. In some cases, oxides of other metals that naturally form protective oxide layers on their surfaces could be used instead of aluminum oxide. These include, but are not limited to titanium (Ti) oxide, chromium (Cr) oxide, tantalum (Ta) oxide, niobium (Nb) oxide, and others. Deposition of such oxide coatings can be performed using a variety of oxide coating deposition techniques, including physical vapor deposition, chemical vapor deposition, magnetron sputtering, atomic layer deposition, microwave-assisted deposition, wet chemistry, and others.

For example, metal oxide precursors in the form of a water-soluble salt may be added to a suspension (in water) of dendritic Si particles to be coated. The addition of a base (e.g., sodium hydroxide or amine) causes formation of a metal (M) hydroxide. Dendritic Si particles suspended in the mixture may then act as nucleation sites for M-hydroxide precipitation. Once dendritic Si particles are coated with a shell of M-hydroxide, they can be annealed in order to convert the hydroxide shell into a corresponding oxide layer that is then well-adhered to the composite surface.

In some embodiments, a Li-ion permeable metal fluoride or metal oxyfluoride layer may be formed on the surface of dendritic Si particles. Examples of such metal fluoride materials include, but are not limited to: vanadium fluoride, vanadium oxyfluoride, iron fluoride, iron oxyfluoride, aluminum fluoride, aluminum oxyfluoride, titanium fluoride, titanium oxyfluoride, aluminum fluoride, aluminum oxyfluoride, zinc fluoride, zinc oxyfluoride, niobium fluoride, niobium oxyfluoride, tantalum fluoride, tantalum oxyfluoride, nickel fluoride, nickel oxyfluoride, magnesium fluoride, magnesium oxyfluoride, copper fluoride, copper oxyfluoride, manganese fluoride, and manganese oxyfluoride. The thickness of such a layer may be in the range of about 1 nm to about 20 nm.

In some embodiments, a Li-ion permeable polymer layer may be formed on the surface of a dendritic Si particles. The thickness of such a layer may be in the range of about 1 nm to about 20 nm. In some embodiments such a polymer layer is electrically conductive. In other embodiments such a polymer layer is electrically insulative. Examples of Li-ion permeable polymers include but are not limited to sulfonated polystyrene grafted fluorinated ethylene propylene, sulfonated inorganic-organic hybrid polymers, partially fluorinated polystyrenes, organically modified layered phosphonates, polyphenylene sulfide, poly(ether ketone), polysaccharides, poly(ethylene glycol), and poly(ethylene oxide).

In some embodiments, the surface of dendritic Si particles can be coated with several (2 or more) different layers of Li-ion permeable materials, including but not limited to Li-ion permeable metal oxides, Li-ion permeable metal fluorides, Li-ion permeable carbon and Li-ion permeable polymers.

The dendritic Si-metal oxide coated particles, dendritic Si-metal fluoride coated particles, dendritic Si-metal oxyfluoride coated particles, or dendritic Si—C coated particles may be joined using a carbon CVD step where a layer of carbon is grown on at least a portion of the various surfaces of the dendritic Si-coated particles by decomposition of a hydrocarbon gas precursor. The resulting composite is a dendritic Si-metal oxide-C porous composite, a dendritic Si-metal fluoride-C porous composite, a dendritic Si-metal oxyfluoride porous composite, or a dendritic Si—C coated-C porous composite, respectively.

In another embodiment, dendritic Si-metal oxide coated particles, dendritic Si-metal fluoride coated particles, dendritic Si-metal oxyfluoride coated particles, or dendritic Si—C coated particles may be joined using a sacrificial binder. In an embodiment, dendritic Si-metal oxide coated particles, dendritic Si-metal fluoride coated particles, dendritic Si-metal oxyfluoride coated particles, or dendritic Si—C coated particles may be coated with a sacrificial polymer binder, which transforms into a conductive carbon layer during thermal annealing in an inert environment. This carbon binds particles together forming a dendritic Si-metal oxide-C porous composite, a dendritic Si-metal fluoride-C porous composite, a dendritic Si-metal oxyfluoride porous composite, or a dendritic Si—C coated-C porous composite.

In some embodiments, an additional Li-ion permeable layer or multiple layers may be formed on the surface of the dendritic Si-metal oxide porous composite, dendritic Si-metal fluoride porous composite, dendritic Si-metal oxyfluoride porous composite or dendritic Si—C-coated porous composite. Such Li-ion permeable additional layers can be: (a) Li-ion permeable metal oxide layer(s). The thickness of such a layer may be in the range of about 1 nm to 20 nm. In some embodiments, an aluminum oxide layer, may be formed on the surface of the porous composite. In some cases, oxides of other metals that naturally form protective oxide layers on their surfaces could be used instead of aluminum oxide. These include, but are not limited to titanium (Ti) oxide, chromium (Cr) oxide, tantalum (Ta) oxide, niobium (Nb) oxide, and others. Deposition of such oxide coatings can be performed using a variety of oxide coating deposition techniques, including physical vapor deposition, chemical vapor deposition, magnetron sputtering, atomic layer deposition, microwave-assisted deposition, wet chemistry, and others. (b) metal fluoride or metal oxyfluoride. Examples of such metal fluoride materials include, but are not limited to: vanadium fluoride, vanadium oxyfluoride, iron fluoride, iron oxyfluoride, aluminum fluoride, aluminum oxyfluoride, titanium fluoride, titanium oxyfluoride, aluminum fluoride, aluminum oxyfluoride, zinc fluoride, zinc oxyfluoride, niobium fluoride, niobium oxyfluoride, tantalum fluoride, tantalum oxyfluoride, nickel fluoride, nickel oxyfluoride, magnesium fluoride, magnesium oxyfluoride, copper fluoride, copper oxyfluoride, manganese fluoride, and manganese oxyfluoride. The thickness of such a layer may be in the range of about 1 nm to about 20 nm. (c) Li-ion permeable polymer. The thickness of such a layer may be in the range of about 1 nm to 20 nm. Examples of Li-ion permeable polymers include but are not limited to sulfonated polystyrene grafted fluorinated ethylene propylene, sulfonated inorganic-organic hybrid polymers, partially fluorinated polystyrenes, organically modified layered phosphonates, polyphenylene sulfide, poly (ether ketone), polysaccharides, poly(ethylene glycol), or poly(ethylene oxide), (d) a combination of 2 or more different layers of Li-ion permeable materials, including but not limited to Li-ion permeable metal oxides, Li-ion permeable metal fluorides, Li-ion permeable carbon and Li-ion permeable polymers.

In some embodiments, the interface between a surface of a dendritic Si-metal oxide porous composite, a dendritic Si-metal fluoride porous composite, a dendritic Si-metal oxyfluoride porous composite, or a dendritic Si—C-coated porous composite and the additional coating layers may contain additional pores. These pores will provide some volume for Si expansion. In some embodiment, such pores can be produced using a sacrificial material. For example, a surface of the composite may be coated first with a polymer, which decomposes upon heating, and then with a metal oxide or a metal oxide precursor. After annealing the sacrificial polymer interlayer may decompose forming a void between a surface of porous composite and a metal oxide layer. In another example, a surface of the composite may be coated first with a polymer, which decomposes upon heating, and then with a polymer which carbonizes (transforms into carbon) upon heating. After annealing the sacrificial polymer interlayer may decompose forming a void (or voids) between a surface of the porous composite and a carbon layer. This void will provide space for Si expansion, while the surface C layer will inhibit access of the electrolyte solvent to the Si surface. In yet another example, a surface of the porous composite may be coated first with a sacrificial oxide, which can be dissolved in certain etching chemicals (acids or bases), and then further coated with a layer of carbon. Upon the treatment of the coated composite in the etching chemicals the oxide layer may dissolve forming voids between the surface of a composite and a carbon coating layer. In one embodiment silicon oxide or aluminum oxide can act as such sacrificial oxide layer.

The coated or uncoated dendritic Si-metal oxide porous composite, dendritic Si-metal fluoride porous composite, dendritic Si-metal oxyfluoride porous composite or dendritic Si—C-coated porous composite may be used to form an anode as previously described.

In another embodiment, Si nanoparticles (either synthesized or commercially obtained) may be fused together to from a dendritic particle using a carbon backbone. Si nanoparticles may be formed by pyrolysis (decomposition) of silane ($SiH_4$) or chlorosilane gases under conditions that promote the formation of discrete particles. In this process, the Si nanoparticles are placed in a reactor with a hydrocarbon gas. The hydrocarbon gas is decomposed to form dendritic particles that are composed of a mixture of carbon and silicon nanoparticles. In an alternate embodiment, a lithium-silicon alloy may be combined with a hydrocarbon gas to form dendritic particles that are composed of a mixture of carbon and lithium-silicon alloy nanoparticles.

In some embodiments, a Li-ion permeable material, including but not limited to Li-ion permeable metal oxides, Li-ion permeable metal fluorides, Li-ion permeable carbon, Li-ion permeable polymers, or any combination thereof, may be formed on the surface of the dendritic Si—C particles before forming a dendritic Si—C composite.

In some embodiments, a Li-ion permeable metal oxide layer may be formed on the surface of dendritic Si—C particles. The thickness of such a layer may be in the range of about 1 nm to 20 nm. In some embodiments, an aluminum oxide layer, may be formed on the surface of the dendritic Si—C particles. In some cases, oxides of other metals that naturally form protective oxide layers on their surfaces could be used instead of aluminum oxide. These include, but are not limited to titanium (Ti) oxide, chromium (Cr) oxide, tantalum (Ta) oxide, niobium (Nb) oxide, and others. Deposition of such oxide coatings can be performed using a variety of oxide coating deposition techniques, including physical vapor deposition, chemical vapor deposition, magnetron sputtering, atomic layer deposition, microwave-assisted deposition, wet chemistry, and others.

For example, metal oxide precursors in the form of a water-soluble salt may be added to a suspension (in water) of dendritic Si—C particles to be coated. The addition of a base (e.g., sodium hydroxide or amine) causes formation of a metal (M) hydroxide. Dendritic Si—C particles suspended in the mixture may then act as nucleation sites for M-hydroxide precipitation. Once dendritic Si—C particles are coated with a shell of M-hydroxide, they can be annealed in order to convert the hydroxide shell into a corresponding oxide layer that is then well-adhered to the composite surface.

In some embodiments, a Li-ion permeable metal fluoride or metal oxyfluoride layer may be formed on the surface of dendritic Si—C particles. Examples of such metal fluoride materials include, but are not limited to: vanadium fluoride, vanadium oxyfluoride, iron fluoride, iron oxyfluoride, aluminum fluoride, aluminum oxyfluoride, titanium fluoride, titanium oxyfluoride, aluminum fluoride, aluminum oxyfluoride, zinc fluoride, zinc oxyfluoride, niobium fluoride, niobium oxyfluoride, tantalum fluoride, tantalum oxyfluoride, nickel fluoride, nickel oxyfluoride, magnesium fluoride, magnesium oxyfluoride, copper fluoride, copper oxyfluoride, manganese fluoride, and manganese oxyfluoride. The thickness of such a layer may be in the range of about 1 nm to about 20 nm.

In some embodiments, a Li-ion permeable polymer layer may be formed on the surface of a dendritic Si—C particles. The thickness of such a layer may be in the range of about 1 nm to about 20 nm. In some embodiments such a polymer layer is electrically conductive. In other embodiments such a polymer layer is electrically insulative. Examples of Li-ion permeable polymers include but are not limited to sulfonated polystyrene grafted fluorinated ethylene propylene, sulfonated inorganic-organic hybrid polymers, partially fluorinated polystyrenes, organically modified layered phosphonates, polyphenylene sulfide, poly(ether ketone), polysaccharides, poly(ethylene glycol), and poly(ethylene oxide).

In some embodiments, the surface of dendritic Si—C particles can be coated with several (2 or more) different layers of Li-ion permeable materials, including but not limited to Li-ion permeable metal oxides, Li-ion permeable metal fluorides, Li-ion permeable carbon and Li-ion permeable polymers.

The dendritic Si—C-metal oxide coated particles, dendritic Si—C-metal fluoride coated particles, dendritic Si—C-metal oxyfluoride coated particles, or dendritic Si—C—C coated particles may be joined using a carbon CVD step where a layer of carbon is grown on at least a portion of the various surfaces of the dendritic Si-coated particles by decomposition of a hydrocarbon gas precursor. The resulting composite is a dendritic Si—C-metal oxide porous composite, a dendritic Si—C-metal fluoride porous composite, a dendritic Si—C-metal oxyfluoride porous composite, or a dendritic Si—C coated porous composite, respectively.

The coated dendritic Si—C particles may then be formed into a porous composite. The porous composite may be formed by exposing a plurality of coated dendritic Si—C particles to a carbon CVD step having operating conditions selected to promote growth of a layer of carbon on at least a portion of the various surfaces of the coated dendritic Si—C particles by decomposition of a hydrocarbon gas precursor. The deposited carbon on the surface of the coated dendritic Si—C particles binds the coated dendritic Si—C particles together to form a coated dendritic Si—C porous composite that may be used to form an electrode (e.g., an anode) of a battery. In another embodiment, the coated dendritic Si—C particles may be coated with a sacrificial polymer binder, which transforms into a conductive carbon layer during thermal annealing in an inert environment. This carbon binds particles together forming a coated dendritic Si—C porous composite In some embodiments, an additional Li-ion permeable layer or multiple layers may be formed on the surface of the dendritic Si—C-metal oxide porous composite, dendritic Si—C-metal fluoride porous composite, dendritic Si—C-metal oxyfluoride porous composite or dendritic Si—C-coated porous composite. Such Li-ion permeable additional layers can be: (a) Li-ion permeable metal oxide layer(s). The thickness of such a layer may be in the range of about 1 nm to 20 nm. In some embodiments, an aluminum oxide layer, may be formed on the surface of the porous composite. In some cases, oxides of other metals that naturally form protective oxide layers on their surfaces could be used instead of aluminum oxide. These include, but are not limited to titanium (Ti) oxide, chromium (Cr) oxide, tantalum (Ta) oxide, niobium (Nb) oxide, and others. Deposition of such oxide coatings can be performed using a variety of oxide coating deposition techniques, including physical vapor deposition, chemical vapor deposition, magnetron sputtering, atomic layer deposition, microwave-assisted deposition, wet chemistry, and others. (b) metal fluoride or metal oxyfluoride. Examples of such metal fluoride materials include, but are not limited to: vanadium fluoride, vanadium oxyfluoride, iron fluoride, iron oxyfluoride, aluminum fluoride, aluminum oxyfluoride, titanium fluoride, titanium oxyfluoride, aluminum fluoride, aluminum oxyfluoride, zinc fluoride, zinc oxyfluoride, niobium fluoride, niobium oxyfluoride, tantalum fluoride, tantalum oxyfluoride, nickel fluoride, nickel oxyfluoride, magnesium fluoride, magnesium oxyfluoride, copper fluoride, copper oxyfluoride, manganese fluoride, and manganese oxyfluoride. The thickness of such a layer may be in the range of about 1 nm to about 20 nm. (c) Li-ion permeable polymer. The thickness of such a layer may be in the range of about 1 nm to 20 nm. Examples of Li-ion permeable polymers include but are not limited to sulfonated polystyrene grafted fluorinated ethylene propylene, sulfonated inorganic-organic hybrid polymers, partially fluorinated polystyrenes, organically modified layered phosphonates, polyphenylene sulfide, poly(ether ketone), polysaccharides, poly(ethylene glycol), or poly(ethylene oxide). (d) a combination of 2 or more different layers of Li-ion permeable materials, including but not limited to Li-ion permeable metal oxides, Li-ion permeable metal fluorides, Li-ion permeable carbon and Li-ion permeable polymers.

In some embodiments, the interface between a surface of a dendritic Si—C-metal oxide porous composite, a dendritic Si—C-metal fluoride porous composite, a dendritic Si—C-metal oxyfluoride porous composite, or a dendritic Si—C—C-coated porous composite and the additional coating layers may contain additional pores. These pores will provide some volume for Si expansion. In some embodiment, such pores can be produced using a sacrificial material. For example, a surface of the composite may be coated first with a polymer, which decomposes upon heating, and then with a metal oxide or a metal oxide precursor. After annealing the sacrificial polymer interlayer may decompose forming a void between a surface of porous composite and a metal oxide layer. In another example, a surface of the composite may be coated first with a polymer, which decomposes upon heating, and then with a polymer which carbonizes (transforms into carbon) upon heating. After annealing the sacrificial polymer interlayer may decompose forming a void (or voids) between a surface of the porous composite and a carbon layer. This void will provide space for Si expansion, while the surface C layer will inhibit access of the electrolyte solvent to the Si surface. In yet another example, a surface of the porous composite may be coated first with a sacrificial oxide, which can be dissolved in certain etching chemicals (acids or bases), and then further coated with a layer of carbon. Upon the treatment of the coated composite in the etching chemicals the oxide layer may dissolve forming voids between the surface of a composite and a carbon coating layer. In one embodiment silicon oxide or aluminum oxide can act as such sacrificial oxide layer.

The coated or uncoated dendritic Si—C-metal oxide porous composite, dendritic Si—C-metal fluoride porous composite, dendritic Si—C-metal oxyfluoride porous composite or dendritic Si—C-coated porous composite may be used to form an anode as previously described.

It will be appreciated that in the concept of the invention the disclosed nanoparticles 106 can be produced not only of Si but also from a variety of other higher capacity anode materials that exhibit significant (greater than 10%) volume changes during insertion and extraction of Li ions. Examples of such materials include: (i) heavily (and "ultra-heavily") doped silicon; (ii) group IV elements; (iii) binary silicon alloys (or mixtures) with metals; (iv) ternary silicon alloys (or mixtures) with metals; and (v) other metals and metal alloys that form alloys with lithium.

Heavily and ultra-heavily doped silicon include silicon doped with a high content of Group III elements, such as boron (B), aluminum (Al), gallium (Ga), indium (In), or thallium (Tl), or a high content of Group V elements, such as nitrogen (N), phosphorus (P), arsenic (As), antimony (Sb), or bismuth (Bi). By "heavily doped" and "ultra-heavily doped," it will be understood that the content of doping atoms is typically in the range of 3,000 parts per million (ppm) to 700,000 ppm, or approximately 0.3% to 70% of the total composition.

Group IV elements used to form higher capacity anode materials may include Ge, Sn, Pb, and their alloys, mixtures, or composites, with the general formula of $Si_a$—$Ge_b$—$Sn_c$—$Pb_d$—$C_e$-$D_f$, where a, b, c, d, e, and f may be zero or non-zero, and where D is a dopant selected from Group III or Group V of the periodic table.

For binary silicon alloys (or mixtures) with metals, the silicon content may be in the range of approximately 20% to 99.7%. Examples of such as alloys (or mixtures) include, but are not limited to: Mg—Si, Ca—Si, Sc—Si, Ti—Si, V—Si, Cr—Si, Mn—Si, Fe—Si, Co—Si, Ni—Si, Cu—Si, Zn—Si, Sr—Si, Y—Si, Zr—Si, Nb—Si, Mo—Si, Tc—Si, Ru—Si, Rh—Si, Pd—Si, Ag—Si, Cd—Si, Ba—Si, Hf—Si, Ta—Si, and W—Si. Such binary alloys may be doped (or heavily doped) with Group III and Group V elements. Alternatively, other Group IV elements may be used instead of silicon to form similar alloys or mixtures with metals. A combination of various Group IV elements may also used to form such alloys or mixtures with metals.

For ternary silicon alloys (or mixtures) with metals, the silicon content may also be in the range of approximately 20% to 99.7%. Such ternary alloys may be doped (or heavily doped) with Group III and Group V elements. Other Group IV elements may also be used instead of silicon to form such alloys or mixtures with metals. Alternatively, other Group IV elements may be used instead of silicon to form similar alloys or mixtures with metals. A combination of various Group IV elements may also used to form such alloys or mixtures with metals.

In some embodiment, during CVD deposition processing, the composition of the coating may be altered by adding doping gas to the gas used to form the deposited layer. Specific examples of doping gases that may be added to any of the CVD processes described herein include, but are not limited to, ammonia ($NH_3$), diborane ($B_2H_6$), or phosphine ($PH_3$). These gases may be combined with hydrocarbon or silane gases in CVD deposition processes to alter the physical properties of the formed layer or nanoparticles.

In some embodiments, a porous composite, as described herein, may further include lithium. Lithium may be in the form of lithium ions that are associated with one or more components of the porous composite. In an embodiment, lithium may be incorporated into the dendritic particles. For example, the dendritic particles may be a three-dimensional, randomly-ordered assembly of nanoparticles of carbon having lithium incorporated into the dendritic particles. In some embodiments, a porous composite may be composed of the dendritic particles that include nanoparticles of carbon having lithium incorporated into the dendritic particles, and a plurality of discrete non-porous nanoparticles of a non-carbon Group 4A element or mixture thereof alloyed with lithium and disposed on a surface of the lithium incorporated dendritic particle.

In another embodiment, a porous composite may include dendritic particles that are composed of lithium-silicon alloy nanoparticles. In an alternate embodiment, a porous composite may include dendritic particles that are composed of lithium-silicon alloy nanoparticles in a carbon matrix. In yet another alternate embodiment, a porous composite may include dendritic particles that are composed of lithium-silicon alloy nanoparticles in a lithium-containing carbon matrix.

Alternatively, the dendritic particles may be formed as has been previously described. Prior to forming the porous composite, the dendritic particles may be treated with a lithium ion containing electrolyte to incorporate lithium ions into the dendritic particles. The lithiated dendritic particles may be used to form a porous composite that is pre-lithiated. In another embodiment, dendritic particles, formed as has been previously described, may be joined to form a porous composite. Prior to use of the porous composite to form an electrode, the porous composite may be treated with a lithium ion containing electrolyte to incorporate lithium ions into the porous composite. The lithiated porous composite may be used to form an electrode that is pre-lithiated.

Alternatively, lithium can be incorporated into the dendritic particles or lithium-ion permeable coating during chemical synthesis. The lithiated dendritic particles may be used to form a porous composite that is pre-lithiated. In another embodiment, lithium containing and lithium-ion permeable coating may formed on the surface of pre-lithiated dendritic particles or on the surface of a pre-lithiated porous composite. The lithiated porous composite may be used to form an electrode that is pre-lithiated.

In some embodiments, lithium may be incorporated into a lithium ion permeable polymer layer that is formed over the dendritic particles and/or the porous composite. In one embodiments, a lithium ion permeable polymer that includes lithium (e.g. lithium ions) may be formed over at least a portion of the dendritic particles of the porous composite. In an embodiment, a lithium ion permeable polymer that includes lithium (e.g., lithium ions) may be formed over at least a portion of the porous composite. The lithium containing polymer may be formed prior to coating, during coating, or after coating of the dendritic particles or the porous composite.

In some embodiments, lithium may be incorporated into a lithium ion permeable ceramic layer that is formed over the dendritic particles and/or the porous composite. In one embodiments, a lithium ion permeable ceramics that includes lithium (e.g. lithium ions) may be formed over at least a portion of the dendritic particles of the porous composite. In an embodiment, a lithium ion permeable ceramics that includes lithium (e.g., lithium ions) may be formed over at least a portion of the porous composite. The lithium containing ceramics may be formed prior to coating, during coating, or after coating of the dendritic particles or the porous composite. In some embodiments, a lithium ion permeable ceramic layer may compose metal oxide, metal fluoride or metal oxyfluoride. In some embodiments, a lithium ion permeable ceramic layer may compose one none-lithium metal. In some embodiments, a lithium ion permeable ceramic layer may compose two none-lithium metals.

In some embodiments, lithium may be incorporated into a lithium ion permeable coating composed of a combination of 2 or more different layers of Li-ion permeable materials, including but not limited to Li-ion permeable metal oxides, Li-ion permeable metal fluorides, Li-ion permeable metal oxyfluorides, Li-ion permeable carbon and Li-ion permeable polymers. In some embodiments, lithium may be incorporated into all the layers of a multi-layered lithium ion permeable coating.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1: Fabrication and Characterization of Si—C Composite Anode Material In this example, a hierarchical "bottom-up" approach was used to form Si—C porous composite granules with high capacity, stable performance, and particle size comparable to that of milled graphite (i.e., about 15 to about 30 micrometers). This powder size is commonly used in the production of Li-ion battery electrodes and does not possess the same inhalation hazard as nanoparticles. This "bottom-up" approach allowed for the fabrication of high capacity stable composite anodes with rapid charging capability.

Briefly, a chemical vapor deposition (CVD) synthesis process has been designed for depositing Si nanoparticles on the surface of carbon black (CB) nanoparticles, wherein the CB nanoparticles form short dendritic chains during high temperature pre-annealing. The about 500 nm to about 1 μm multi-branched nanocomposite was then self-assembled into large porous spherical granules during the atmospheric pressure CVD deposition of C (as schematically shown in FIG. 2). The Si CVD deposition time as well as the pressure and temperature in the deposition system determined the size of the deposited Si nanoparticles. The size of the branches in the dendritic particle and the size of the deposited Si nanoparticles determined the pore size in the granule. The diameter of the composite granules was influenced by the carbon CVD process parameters and by the size of the initial branched carbon dendritic particles. Therefore, the developed process allowed control over the particle size, pore size, and composition of the composite granule.

Annealed and chained CB particles were selected as substrates for Si spheres assembly due to their open structure, very low apparent density, and high specific surface area (about 80 m$^2$/g), providing multiple accessible sites for Si deposition. The ultra low cost of carbon black (about 10 to about 20% of the cost of purified natural graphite) and large production volume (about 9 times higher than that of natural graphite) help maintain the low cost of the synthesized composite granules. Impurities in carbon electrodes are detrimental to battery operation, contributing to parasitic side reactions, gassing in the cells, self-discharge and degradation of the shelf life of the cells. The annealing of CB at temperatures above about 2000° C. resulted in graphitization, linkage of neighboring particles, and a very high degree of purification (greater than about 99.9%), promoting consistent properties, which are desired for Li-ion battery systems and are unattainable via chemical purification with acids.

Si deposition onto the annealed carbon black (~0.5 g) was carried out at .about.1 torr in a horizontal tube furnace (inner-tube diameter ~28 mm) heated to 500 C. High-purity 5% SiH$_4$ in a He precursor gas mixture (Airgas) was introduced at a flow rate of 50 sccm for 1 h. Before and after the Si deposition experiments, the system was purged with high-purity Ar (99.99%, Airgas) at a flow rate of 50 sccm. The samples were taken out of the furnace at temperatures below 50 C.

Figure 3A:
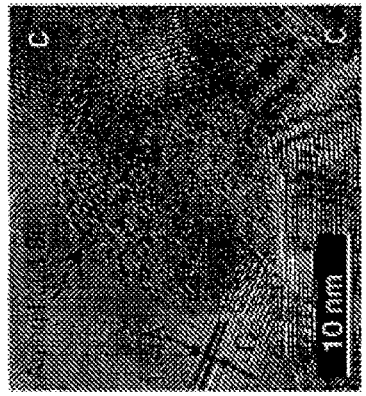
FIGS. 3(a) through 3(c) include transmission electron microscope (TEM) images obtained at different magnifications for a composite granule in accordance with some embodiments.
Figure 3B:
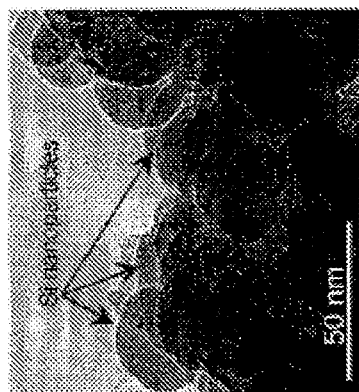
Figure 3C:
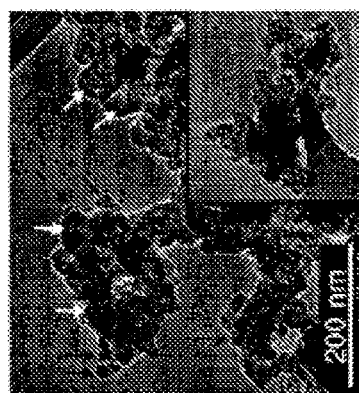
Figure 3D:
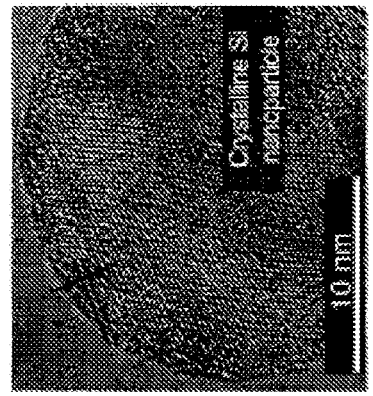
FIG. 3(d) provides an EDX spectrum of a Si—C composite granule showing the C and Si Kα lines, O and Cu sample holder lines.

Transmission electron microscopy (TEM) revealed the nanoparticles to possess a spherical shape of about 10 nm to about 30 nm in diameter, having been deposited on the surface of the annealed CB (FIG. 3(a)), as previously shown in FIG. 1(a). The black arrows in FIG. 3(a) point to spherical amorphous Si nanoparticles, while white arrows point to the edges of the graphitized carbon black backbone chain of the dendritic particle (the size of the inset is 800×800 nm). Most nanoparticles exhibited an amorphous microstructure or were highly disordered, as shown in FIG. 3(b). The nanoparticles densely coated the carbon surface, frequently attached to the edges of the graphitic structures. Once a stable nucleus was formed, growth occurred via adsorption of gas species on the nucleus surface. The spherical shape of the particles minimized the contact area between the Si and CB surfaces, likely due to the high interfacial energy between Si and the flat faces of the graphitized CB particles, which possessed a negligible concentration of surface functionalities. The TEM image of FIG. 3(c) shows the highly-ordered graphitic structure of a carbon black surface with (002) interplanar spacing of about 3.34 Angstroms and the amorphous structure of the Si nanoparticles. The low synthesis temperature may have minimized the surface mobility of Si atoms and contributed to the smooth morphology of the Si surface. No impurities were detected in the sample by energy dispersive X-ray spectroscopy (EDX), as shown in FIG. 3(d).

In wet granulation, a liquid binder wets small primary particles as they are agitated, causing them to self-assemble into larger spheres by a combination of viscous and capillary forces. The drying or annealing process transforms the binder into a dense solid which preserves the shape of the granules. For electrode particles, the solid granule should ideally have high electrical conductivity, high mechanical stability, and high permeability to Li ions. Graphitic carbon exhibits a unique combination of these attributes. In order to prevent the oxidation of Si nanoparticles a hydrocarbon was selected as a carbon-precursor binder for granulation. In a conventional wet granulation process, a liquid binder is typically introduced as droplets. It penetrates into the pores of the powder surface, forming initial nuclei, which grow over time. If the droplet size is relatively small, the nucleation will occur by distribution of the drops on the surface of the particles and subsequent particle coalescence. The process is similar to melt agglomeration, where the binder melts and the melt-coated particles stick together to form granules. However, it is commonly difficult to achieve uniform binder deposition required for the controlled and uniform formation of granules. Therefore, in this study, the binder was introduced in gaseous form.

Figure 3E:
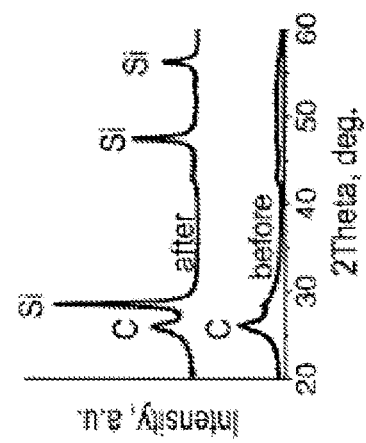
FIG. 3(e) provides XRD spectra of Si-coated carbon black both before and after carbon deposition at about 700° C. for about 30 minutes.
Figure 3F:
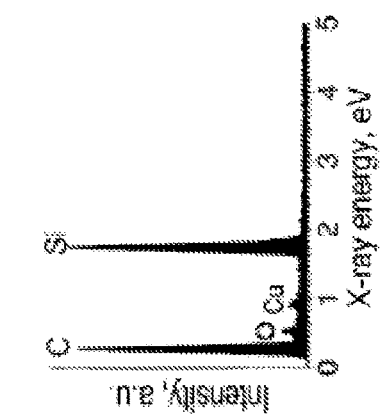
FIG. 3(f) provides a TEM image of a Si nanoparticle crystallized after exposure to about 700° C.

Carbon deposition was carried out at atmospheric pressure in a horizontal tube furnace (inner-tube diameter×20 mm) heated to 700 C. High-purity $C_3H_6$ (propylene) precursor gas (99.5%, Airgas) was introduced at a flow rate of 50 sccm for 30 min. A bubbler filled with mineral oil was placed at the exhaust to minimize the backflow of air into the system. Before and after the C deposition experiments, the system was purged with high-purity Ar (99.99%, Airgas) at a flow rate of 50 sccm. The samples were taken out of the furnace at temperatures below 50 C. This higher temperature step caused significant crystallization in the deposited Si nanoparticles. X-ray diffraction (XRD) analysis of the produced samples showed the average grain size of the Si nanoparticles to be about 30 nm, as shown in FIG. 3(e). TEM studies confirmed the crystalline structure of Si nanoparticles after exposure to about 700° C. (FIG. 3(f)).

Figure 4A:
FIGS. 4(a) through (d) include scanning electron microscope (SEM) images recorded at different magnification of the structure of a Si—C composite granule self-assembled during carbon deposition on the Si-decorated annealed carbon black particles.
Figure 4B:
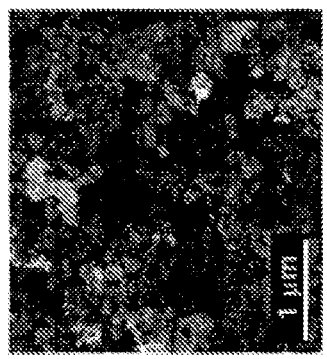
Figure 6:
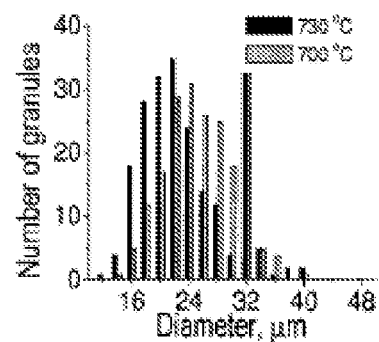
FIG. 6 graphically illustrates the size distribution of various spherical granules synthesized at about 700 and about 730° C.

The SEM micrographs of FIGS. 4(a) and (b) show the spherical granules formed in the course of carbon deposition. The particle surface was rough, with surface asperities of about 500 nm to about 1 as seen in FIGS. 4(b) and (c). In spite of the carbon coating, small Si nanoparticles were visible on the surface, as evidenced in FIG. 4(d). The white arrows in FIG. 4(d) point to carbon-coated Si nanoparticles visible on the surface of the granules. The diameter of the granule spheres ranged from about 15 µm to about 35 µm and showed a narrow particle size distribution with the average diameter of about 26 µm (FIG. 4(e)). The granule size distribution was controlled by the granulation process conditions, as shown in FIG. 6 and could be optimized for the specific application. Propylene decomposition took place via multiple intermediate steps. The hydrocarbon products of intermediate steps of $C_3H_6$ decomposition are known to form larger molecular weight compounds, including toluene, ethylbenzene, styrene, naphthalene, biphenyl and others, which adsorb on the surface of the substrates during the CVD reaction. In the adsorbed state, they acted as a liquid agglomeration binder before their final transformation into carbon. Initially, vibration was introduced to the sample tube in order to agitate the nanoparticles. However, further experiments proved that due to the very low density of the granules, the vibration was unnecessary. All of the granules were synthesized without artificial agitation in a simple horizontal tube furnace.

The bottom-up assembly preserved most of the surface area of the primary particles. Indeed, $N_2$ gas sorption measurements, as shown in FIG. 4(f) showed that the decrease of the specific surface area (SSA) after carbon deposition was rather modest—Brunauer-Emmett-Teller (BET) SSA of the Si—C self-assembled granules was about 24 m²/g, which was close to that of the Si-decorated CB (about 33 m²/g). The pore size distribution of the spherical particles showed the presence of about 30 nm to about 100 nm pores (FIG. 4(g)). These pores were also visible on the SEM micrographs shown in FIGS. 4(c) and (d). Carbon coating of the surface of the pure CB also resulted in the formation of porous granules with larger surface features and no visible particles of about 10 nm to about 30 nm diameter (FIG. 4(h)).

Example 2

Fabrication and Characterization of Coin Cells Using Si—C Composite Anode

Coin cells (2016) with metallic Li counter electrodes were employed to evaluate the electrochemical performance of the anodes produced in EXAMPLE 1. Working electrodes were prepared by casting slurry containing an active material (C—Si composite granules or graphite or annealed carbon black), a polyvinylidene fluoride binder (pure 9305 (Kureha) for carbon electrodes and 9305 with 10 wt % addition of polyacrylic acid for Si-containing electrodes; 20 wt % of the binder was used for annealed carbon black and for C—Si composite granules and 10 wt % for graphite) and N-methyl-2-pyrrolidone on an 18 µm Cu foil (Fukuda). The electrodes were calendared and degassed in vacuum at 70 C for at least 2 h inside an Ar-filled glove box (<1 ppm of oxygen and water, Innovative Technology) and were not exposed to air before assembling into the cells. The commercial electrolyte was composed of 1M $LiPF_6$ salt in an ethylene carbonate/diethyl carbonate/dimethyl carbonate/vinylene carbonate mixture (Novolyte Technologies). Lithium metal foil (1 mm thick) was used as a counter electrode. 2016 stainless-steel coin cells (without any springs) were used for electrochemical measurements. The working electrode foil was spot-welded to the coin cell for improved electrical contact. The charge and discharge rates were calculated assuming the theoretical capacities for C and Si, given the composition of the active material (either C or C—Si mixture). The coulombic efficiency was calculated as 100% ($C^{dealloy}=C^{alloy}$), where $C^{alloy}$ and $C^{dealloy}$ are the capacity of the anodes for Li insertion and extraction.

Figure 7:
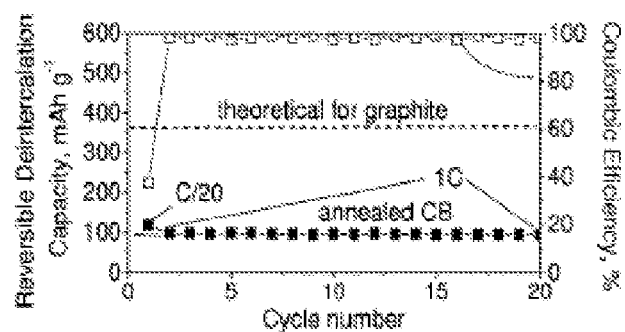
FIG. 7 provides reversible Li deintercalation capacity and Coulombic efficiency of an annealed carbon black electrode vs. cycle number in comparison to the theoretical capacity of graphite.

FIG. 5(a) illustrates the reversible Li deintercalation capacity and Coulombic efficiency of the granule electrodes vs. cycle number in comparison to the theoretical capacity of graphite. The specific reversible deintercalation capacity of the sample with an estimated about 50 wt. % of Si reached about 1950 mAh/g at C/20, as shown in FIG. 5(a). This gravimetric capacity was greater than about 5 times higher than that of the theoretical capacity of graphite, about 6 times that of high performance graphitic anodes, and was about 16 times that of the annealed carbon black (FIGS. 5(a), 5(b) and 7). The specific capacity of the Si nanoparticles alone was estimated to be about 3670 mAh/g at C/20, which is the highest value ever reported for nanoparticles. It approached the theoretical capacity of Si (about 4200 mAh/g if $Li_{22}Si_5$ is achieved). Such high specific capacity value indicates high accessibility of the active Si for Li insertion in the designed composite architecture. The overall carbon contribution was estimated to be about 230 mAh/g (115 mAh/0.5 g). The volumetric capacity was determined to be about 1270 mAh/cc at C/20, which was higher than about 620 mAh/g for graphitic anodes. The irreversible capacity losses in the first cycle (FIG. 5(a)) are related to the solid-electrolyte interphase formation and, in contrast to carbon black (FIGS. 5(b) and 7), are rather modest (about 15%) due to the high electrode capacity (FIG. 4(g)).

While Si anodes are known to suffer from sluggish kinetics, the self-assembled electrodes of EXAMPLE 1 demonstrated outstanding high rate capability. The specific capacity of the composite anodes at the fast discharge rates of 1 C and 8 C was 1590 and 870 mAh/g, respectively, which was about 82 and about 45% of that at C/20 (FIGS. 5(a) and (b)). Even graphite, with high Li diffusion coefficients and low overall capacity could not match such capacity retention at 8 C rate (2.98 A/g) and showed deintercalation capacity of about 40 mAh/g, which was 13% of the C/20 specific capacity (FIG. 5(b)). For the same specific current value (2.98 A/g), the composite Si—C electrodes of EXAMPLE 1 showed capacity in excess of 1500 mAh/g, which was over 37 times higher. Clearly, in spite of the large particle size (FIGS. 4(a) and (b)), Li ions were able to rapidly reach the active anode material within each granule.

The differential capacity curves of FIG. 5(c) show broad lithiation (Li insertion) peaks at 0.21 and 0.06 V, and a narrower delithiation (Li extraction) peak at 0.5 V. The C delithiation peaks commonly observed at 0.2V were too small to be visible, due to the very small contribution of carbon to the overall anode capacity. A delithiation peak at 0.3 V often reported in both micron-scale Si-powder and Si-nanowire cells was not present. An increase in the 0.5 V peak height after the first cycle indicates improvement in Li extraction kinetics. The formation of an amorphous S—Li alloy upon the insertion of Li into crystalline Si in the first cycle began at 0.1 V, in agreement with previous studies on nanowires. Subsequent cycles showed an additional lithiation peak at 0.21 V, which corresponds to higher voltage lithiation of amorphous S—Li phase.

Figure 4C:
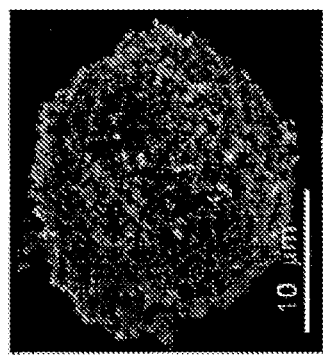
Figure 4D:
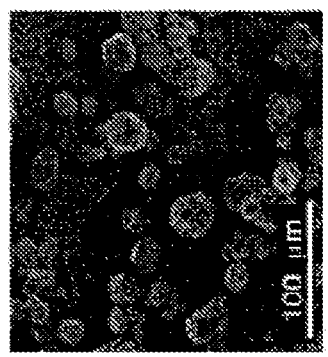
Figure 4E:
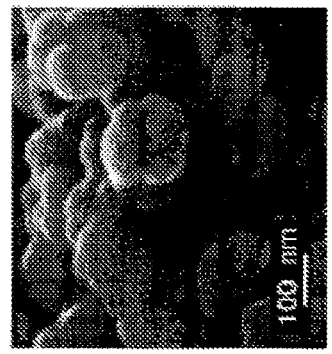
FIG. 4(e) provides the cumulative size distribution of spherical granules synthesized at about 700° C.
Figure 4F:
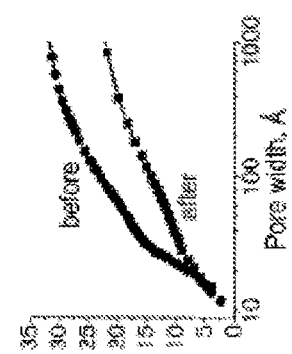
FIG. 4(f) illustrates $N_2$ sorption isotherms on the surface Si-decorated annealed carbon black both before and after carbon chemical vapor deposition.
Figure 4G:
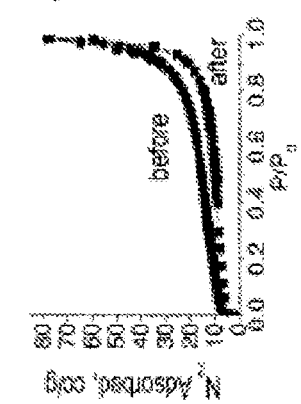
FIG. 4(g) provides Barrett-Joyner-Halenda cumulative specific surface area of Si-decorated annealed carbon black both before and after carbon chemical vapor deposition.
Figure 4H:
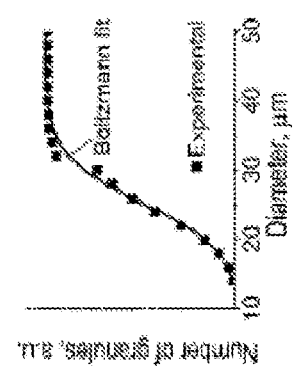
FIG. 4(h) provides high-magnification SEM images of the surface of spherical granules produced during carbon-coating of pure carbon black, shown for comparison to FIG. 4(d)

The pores available in the composite granules for Si expansion during Li insertion (FIGS. 4(c), (d), (f), and (g)) also allowed for efficient and stable anode performance (FIG. 5(a)). The SEM studies of the anode particles after high speed mixing, calendaring, and cycling demonstrated exceptional robustness of the granules (FIG. 5(d)). The tap density of the Si—C powder was estimated to be about 0.49 g/cc, which is lower than that of the graphite (about 1.3 g/cc), but higher than that of annealed carbon black (about 0.22 g/cc). The Si nanopowder (10-30 nm) alone was expected to have an even lower tap density.

The observed high capacity (FIG. 5(a)), combined with excellent sample stability and high rate capability was unprecedented in Si—C composite powders. In contrast to many photonic, electronic, or membrane applications, where a high degree of order is typically required, the granules assembled according to EXAMPLE 1 may benefit from a disorder in their structure. If the path of Li-ions is blocked or impeded in one narrow channel by an expanded Si—Li alloy particle or by an area of unevenly formed solid-electrolyte interphase (SEI), the interconnected aperiodic porous network allowed for the redirection of the ion traffic, maintaining rapid charging capability for these granules. Therefore, the disorder in the granules may enhance the functionality of the composite anode, as it does in some photonic crystals and catalytic structures.

Thus, these two examples demonstrated applications of a hierarchical bottom-up assembly method for the rational design of nanocomposite powders that offer exceptional properties for use in energy storage applications. While nanoparticles or nano-whiskers are known to possess inhalation and often explosion risks, poor flow and handling, and challenges in metering and control, the Si—C nanocomposite granules of these examples provide improved handling, reduced dustiness which minimizes losses, increased bulk density, and other positive attributes.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of manufacture, comprising:
producing a composite Si—C particle comprising one or more internal Si nanoparticles,
wherein the one or more internal Si nanoparticles are deposited from a gaseous material comprising Si and H, and
wherein the one or more internal Si nanoparticles comprise 15 wt. % to 90 wt. % of the composite Si—C particle.

2. The method of claim 1, wherein the producing comprises:
exposing a carbon-comprising particle to the gaseous material comprising Si and H; and
depositing the one or more internal Si nanoparticles onto an interior surface of one or more internal pores of the carbon-comprising particle.

3. The method of claim 2, wherein the depositing further deposits at least one Si nanoparticle onto an external surface of the carbon-comprising particle.

4. The method of claim 2, wherein the carbon-comprising particle is a carbon-black particle.

5. The method of claim 2, further comprising:
prior to the exposing, annealing the carbon-comprising particle at a temperature in excess of 2000° C.

6. The method of claim 2, wherein the carbon-comprising particle is electrically conductive.

7. The method of claim 2, wherein the exposing exposes the gaseous material to the carbon-comprising particle at 1 torr at 500° C. for 1 hour.

8. The method of claim 2, wherein the one or more internal Si nanoparticles are grown on the interior surface of the one or more internal pores of the carbon-comprising particle from the Si of the gaseous material.

9. The method of claim 1, wherein the gaseous material comprises silane.

10. The method of claim 1, wherein the gaseous material comprises chlorosilane.

11. The method of claim 2, wherein the depositing deposits the one or more internal Si nanoparticles via chemical vapor deposition (CVD).

12. The method of claim 1, wherein the gaseous material comprises a silane gas that is combined with one or more other materials.

13. The method of claim 12, wherein the one or more other materials comprise ammonia, diborane, or phosphine.

14. The method of claim 1, further comprising:
depositing a carbon-comprising coating on the composite Si—C particle.

15. The method of claim 14, wherein an average thickness of the carbon-comprising coating is in the range of 1 nm to 20 nm.

16. The method of claim 1, wherein the composite Si—C particle further comprises one or more surface pores.

17. The method of claim 2, wherein the one or more internal pores include at least one internal pore with a size between 30 nm and 100 nm.

18. The method of claim 1, further comprising:
casting a slurry that comprises the composite Si—C particle to produce an anode electrode.

19. The composite Si—C particle produced in accordance with the method of claim 1.

20. The composite Si—C particle of claim 19, wherein the one or more internal Si nanoparticles have an average diameter between 10 to 30 nm.

21. The composite Si—C particle of claim 19, wherein the composite Si—C particle exhibits a spherical shape.

22. The composite Si—C particle of claim 19, wherein the composite Si—C particle is porous.

23. The composite Si—C particle of claim 19, wherein a particle size of the composite Si—C particle is between 15 to 30 μm.

24. The composite Si—C particle of claim 19, wherein the composite Si—C particle is spherical.

25. The composite Si—C particle of claim 19, wherein the composite Si—C particle comprises:

an electrically-interconnected matrix having a three-dimensional, randomly-ordered structure forming internal pores within the matrix, wherein the one or more internal Si nanoparticles comprise a plurality of Si nanoparticles disposed within the internal pores of the matrix, the plurality of Si nanoparticles comprising Si or an Si mixture; and a coating disposed on at least a portion of an outer surface of the composite Si—C particle, wherein the internal pores define a pore volume within the composite Si—C particle that is different from a volume occupied by the plurality of Si nanoparticles, and wherein the coating is arranged to inhibit access of electrolyte into the pore volume defined by the internal pores.

26. The method of claim 15, wherein the carbon-comprising coating is deposited via a gaseous precursor.

27. The method of claim 26, wherein the gaseous precursor comprises propylene.

* * * * *

(12) EX PARTE REEXAMINATION CERTIFICATE (12706th)
United States Patent
Yushin et al.

(10) Number: US 11,715,825 C1
(45) Certificate Issued: Sep. 17, 2024

(54) ELECTRODES, LITHIUM-ION BATTERIES, AND METHODS OF MAKING AND USING SAME

(71) Applicant: Sila Nanotechnologies Inc., Alameda, CA (US)

(72) Inventors: Gleb Yushin, Atlanta, GA (US); Oleksandr Magazynskyy, Atlanta, GA (US); Patrick Dixon, Dunwoody, GA (US); Benjamin Hertzberg, New York, NY (US)

(73) Assignee: SILA NANOTECHNOLOGIES, INC., Alameda, CA (US)

Reexamination Request:
No. 90/019,286, Oct. 16, 2023

Reexamination Certificate for:
Patent No.: 11,715,825
Issued: Aug. 1, 2023
Appl. No.: 17/667,427
Filed: Feb. 8, 2022

Related U.S. Application Data

(63) Continuation of application No. 16/853,301, filed on Apr. 20, 2020, now Pat. No. 11,557,757, which is a
(Continued)

(51) Int. Cl.
| | |
|---|---|
| H01M 4/36 | (2006.01) |
| B82Y 30/00 | (2011.01) |
| H01B 1/18 | (2006.01) |
| H01B 1/24 | (2006.01) |
| H01M 4/133 | (2010.01) |
| H01M 4/134 | (2010.01) |
| H01M 4/137 | (2010.01) |
| H01M 4/1393 | (2010.01) |

(Continued)

(52) U.S. Cl.
CPC .......... *H01M 4/366* (2013.01); *H01M 4/133* (2013.01); *H01M 4/137* (2013.01); *H01M 4/38* (2013.01); *H01M 4/587* (2013.01); *H01M 4/602* (2013.01); *H01M 4/625* (2013.01); *B82Y 30/00* (2013.01); *C01P 2004/64* (2013.01); *H01B 1/18* (2013.01); *H01B 1/24* (2013.01); *H01M 4/134* (2013.01); *H01M 4/1393* (2013.01); *H01M 4/1395* (2013.01); *H01M 4/386* (2013.01); *H01M 4/387* (2013.01); *H01M 10/0525* (2013.01); *Y02E 60/10* (2013.01); *Y02T 10/70* (2013.01); *Y10S 977/773* (2013.01)

(58) Field of Classification Search
None
See application file for complete search history.

(56) References Cited

To view the complete listing of prior art documents cited during the proceeding for Reexamination Control Number 90/019,286, please refer to the USPTO's Patent Electronic System.

*Primary Examiner* — Sean E Vincent

(57) ABSTRACT

Described herein are improved composite anodes and lithium-ion batteries made therefrom. Further described are methods of making and using the improved anodes and batteries. In general, the anodes include a porous composite having a plurality of agglomerated nanocomposites. At least one of the plurality of agglomerated nanocomposites is formed from a dendritic particle, which is a three-dimensional, randomly-ordered assembly of nanoparticles of an electrically conducting material and a plurality of discrete non-porous nanoparticles of a non-carbon Group 4 A element or mixture thereof disposed on a surface of the dendritic particle. At least one nanocomposite of the plurality of agglomerated nanocomposites has at least a portion of its dendritic particle in electrical communication with at least a portion of a dendritic particle of an adjacent nanocomposite in the plurality of agglomerated nanocomposites.

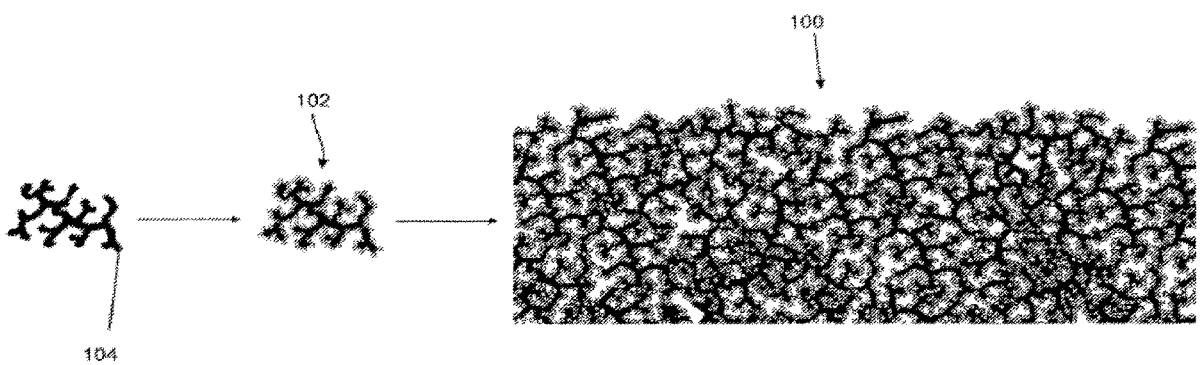

Related U.S. Application Data continuation of application No. 15/612,890, filed on Jun. 2, 2017, now Pat. No. 10,629,898, which is a continuation of application No. 14/513,920, filed on Oct. 14, 2014, now Pat. No. 9,673,448, which is a continuation of application No. 13/431,591, which is a continuation-in-part of application No. PCT/US2010/050794, filed on Sep. 29, 2010, now Pat. No. 8,889,295.

(60) Provisional application No. 61/246,741, filed on Sep. 29, 2009.

(51) Int. Cl.
*H01M 4/1395* (2010.01)
*H01M 4/38* (2006.01)
*H01M 4/587* (2010.01)
*H01M 4/60* (2006.01)
*H01M 4/62* (2006.01)
*H01M 10/0525* (2010.01)

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-3 and 6-27 is confirmed.

Claims 4-5 were not reexamined.

\* \* \* \* \*